United States Patent

Yamaguchi

[19]

[11] Patent Number: 5,995,641
[45] Date of Patent: Nov. 30, 1999

[54] FINGERPRINT IDENTIFICATION DEVICE AND METHOD OF USING SAME

[75] Inventor: Masahiko Yamaguchi, Kawasaki, Japan

[73] Assignee: Fujitsu Denso Ltd., Kanagawa-ken, Japan

[21] Appl. No.: 08/816,406

[22] PCT Filed: Aug. 26, 1996

[86] PCT No.: PCT/JP96/02377

§ 371 Date: Mar. 5, 1997

§ 102(e) Date: Mar. 5, 1997

[51] Int. Cl.[6] .................................................. G06K 9/00
[52] U.S. Cl. .......................................................... 382/124
[58] Field of Search .................. 382/115–116, 124–127; 356/71, 376; 340/825.34

[56] References Cited

U.S. PATENT DOCUMENTS

| | | | |
|---|---|---|---|
| 3,743,421 | 7/1973 | Maloney | 356/71 |
| 4,805,223 | 2/1989 | Denyer | 382/4 |
| 5,187,747 | 2/1993 | Capello et al. | 382/124 |
| 5,241,606 | 8/1993 | Horie | 382/126 |
| 5,633,947 | 5/1997 | Sibbald | 382/124 |

FOREIGN PATENT DOCUMENTS

| | | |
|---|---|---|
| 3-142685 | 6/1991 | Japan . |
| 4-320583 | 11/1992 | Japan . |
| 6-28459 | 2/1994 | Japan . |
| 7-271948 | 10/1995 | Japan . |
| 7-271980 | 10/1995 | Japan . |
| 7-271981 | 10/1995 | Japan . |
| 8-96128 | 4/1996 | Japan . |

*Primary Examiner*—Leo H. Boudreau
*Assistant Examiner*—Bhavesh Mehta
*Attorney, Agent, or Firm*—Blackwell Sanders Peper Martin

[57] ABSTRACT

A fingerprint identification device includes a fingerprint image pickup unit which receives reflected light from a light source to take a picture, and an in-block average luminance calculation unit which divides a fingerprint judging area into a plurality of blocks and calculates average luminance within the blocks according to a multivalued image signal from the fingerprint image pickup unit. A luminance deviation calculation and arrangement unit determines deviation between the in-block average luminance from the in-block average luminance calculation unit and the luminance of each picture element in the judging area to determine the number of picture elements corresponding to the deviation. A fingerprinting judging unit judges that fingerprinting has been made for the fingerprint image pickup unit when the number of picture elements within a prescribed range with the deviation near zero does not exceed a threshold for the number of picture elements corresponding to the deviation from the luminance deviation calculation and arrangement unit, and a fingerprint identification unite identifies the fingerprint based on the multivalued image signal from the fingerprint image pickup unit when the fingerprinting judging unit has judge the fingerprinting state.

2 Claims, 20 Drawing Sheets

FINGERPRINT IDENTIFICATION DEVICE AND METHOD OF USING SAME

BACKGROUND OF THE INVENTION

1. Field of the Invention

The present invention relates to a method for renewing dictionary image data in a fingerprint identification device, and particularly to a method for renewing dictionary images in a fingerprint identification device, in which dictionary identification time can be shortened.

The present invention relates to a method for renewing dictionary images in a fingerprint identification device, and particularly to a method for renewing dictionary images in a fingerprint identification device, in which the dictionary images can be kept in the best condition.

The present invention relates to a dictionary registration and identification method for a fingerprint identification device, and particularly to a multiple-dictionary registration and identification method for a fingerprint identification device, in which an identification rate is improved by registering and identifying a plurality of dictionaries.

The present invention relates to a method for judging fingerprinting in a fingerprint identification device, and particularly to a fingerprinting judging method in a fingerprint identification device, in which continuous identification rejections can be prevented.

The present invention relates to a fingerprint identification device which can prevent misjudgment in identifying a fingerprint and to a fingerprinting judging method.

2. Description of the Related Art

In a fingerprint identification device, by identifying an entered fingerprint image with fingerprint dictionary data previously registered in a dictionary memory to judge whether or not the entered fingerprint image corresponds to a finger of a particular person whose dictionary data is previously registered in the fingerprint identification device.

In such a case, it is desired that time required for dictionary identification can be shortened by enabling to quickly identify the conformity with the multiple dictionary data to be used for identification.

The fingerprint dictionary data is image data of multiple characteristic parts, such as ending points and bifurcation points, of a fingerprint image extracted by a sensor and registered together with its coordinate data, and when the entered fingerprint image is detected to conform with some of such characteristic data, it is determined to be identification pass.

On the other hand, in fingerprinting by using a sensor, it has been experienced that fingerprints are relatively easily deformed depending on the position of fingers on a fingerprinting surface, the magnitude of pressing a finger against the fingerprinting surface or the like, and the fingerprint image to be taken into the fingerprint identification device is varied.

Therefore, if dictionary data is registered as many as possible on the same person, various cases can be covered even when the fingerprints are deformed as described above. Adopting a method of determining as an identification pass when the entered fingerprint image matches with any one of dictionary images, an identification match rate (acceptance rate) of the fingerprint identification device can be improved.

FIG. 14 shows the configuration of conventional dictionary data, in which (a) indicates all dictionary data, (b) dictionary data on one person within all dictionary data, and (c) one characteristic data in the dictionary data on one person.

All dictionary data comprises dictionary data on M to-be-identified persons (1 to M), for example. Dictionary data on one person comprises N minutiae (minutiae 1 to N), for example. And, one minutia data comprises image data on minutiae and its coordinate data in a prescribed window.

In the fingerprint identification device, by using dictionary data having N minutia data registered therein, pattern matching is made from minutia 1 in order with respect to the entered fingerprint image which is taken in at the fingerprint identification, and if a pattern matches on, for example, L minutia data, it is determined as identification pass.

FIG. 15 shows an example of identifying minutiae in which (a) indicates Example 1, and (b) Example 2. Among N minutiae, those with matched patterns are indicated by ○, and those without matched patterns by X.

Example 1 shows that minutia 2 does not match but other minutiae match, and it is determined to be identification pass based on the pattern matching of (L+1) minutiae. And, Example 2 shows that minutiae 2, 3 and 5 do not match but other minutiae match, and it is determined to be identification pass based on the pattern matching of (L+3) minutiae.

Besides, in the fingerprint identification device, to complete the identification with the dictionary data soon, when N minutiae have K minutiae which do not have matched patterns in succession, it is judged that the entered fingerprint image and the dictionary data are not of the same person, it is determined as identification rejection, and identification of the remaining minutiae with the dictionary data is canceled.

FIG. 16 shows the cancellation of the identification process, in which dictionary data comprising N minutiae is identified in succession, K (=3) continuous identification mismatches are detected at minutiae 5 through 7, and the process is terminated at this point as identification rejection. In this case, even if it is possible that there may be a minutia having a matched pattern among, for example, minutia 8 through minutia N, the remaining process is canceled.

In identifying the minutiae shown in FIG. 15, when minutia data that have patterns which often do not match with entered fingerprint images are contained many in minutia data of less than L, time required before patterns are matched with L minutia data becomes longer than when such minutia data are not contained.

And, in the cancellation of the identification process shown in FIG. 16, when the minutia data that have patterns which do not match with the entered fingerprint images are contained at least K in succession in the neighborhood of the head of the N minutia data string, an identification match rate (acceptance rate) is lowered.

FIG. 1 shows the configuration of a conventional fingerprint identification device to which the present invention are applied and which comprises a core section 10 and a control 20. The core section 10 performs registration and identification of fingerprint images, and the control 20 controls the processing in the core section 10. The control 20 sends a command to the core section 10 and receives from the core section a response to the command.

In the core section 10, reference numeral 11 denotes a central processing unit (CPU) for controlling the processing of registration and identification of fingerprint images. And, reference numeral 12 denotes a sensor for taking the image of a fingerprint which is to be registered or identified, 13 a frame memory for storing the image taken from the sensor 12 as a multivalued image, 14 an image processing circuit for processing various images, such as binarization of a multivalued image, extraction of minutiae from a binarized image, pattern matching of a binarized image with minutiae and the like, 15 a binary memory for storing a binarized image, 16 a dictionary memory for storing the minutiae extracted from a binarized image as a dictionary image, and 17 an identification memory for keeping the minutiae of fingerprints to be used for identification; and these are connected to a bus 18 of the CPU 11. And, reference numeral 19 is a control interface for interfacing of a command and a response between the bus 18 and the control 20.

As a dictionary registration identifying method in such a fingerprint identification device, use of a plurality of dictionary images has been proposed to improve an identification rate.

The dictionary images are minutiae such as ending points and bifurcation points extracted from the image of a fingerprint pressed on the sensor, and when some of such characteristics parts are detected to match with the entered image, it is determined to be identification pass.

On the other hand, in fingerprinting by using a sensor, it has been experienced that fingerprints are relatively easily deformed depending on the position of fingers on a fingerprinting surface, the magnitude of pressing a finger against the fingerprinting surface or the like, and the fingerprint image to be taken into the fingerprint identification device is varied.

Therefore, if dictionaries are registered as many as possible on the same person, various cases can be covered even when the fingerprints are deformed as described above. Adopting a method of determining as an identification pass when the entered fingerprint image matches any one in the dictionaries, an identification rate of the fingerprint identification device can be improved.

FIG. 17 shows a flowchart of registration and identification processing in a conventional multiple dictionary method, in which (a) indicates the registration processing, and (b) the identification processing.

In the multiple dictionary method, the registration processing is performed as follows.

① When a fingerprint is taken, a fingerprint image (first image) entered through the sensor 12 is binarized in the image processing circuit 14 through the frame memory 13, and stored in the binary memory 15.

② From the binarized image stored in the binary memory 15, minutiae are extracted in the image processing circuit 14 by running the minutia extracting program in the CPU 11 to temporarily register as a fingerprint image in the identification memory 17.

③ When a fingerprint is taken again, a fingerprint image (second image) is binarized in the image processing circuit 14 through the sensor 12 and the frame memory 13, and stored in the binary memory 15.

④ By running the identification processing program in the CPU 11, pattern matching is performed in the image processing circuit 14 in view of the dictionary image (first image) temporarily registered in the identification memory 17 and the binarized image (second image) stored in the binary memory 15.

⑤ When it is determined to be identification pass as a result of identification, the dictionary image for the first image temporarily registered is formally registered as dictionary 1 in the dictionary memory 16.

⑥ Besides, from the binarized image of the second image stored in the binary memory 15, the dictionary image, which is obtained by extracting the minutiae in the image processing circuit 14 by running the minutia extracting program in the CPU 11, is formally registered as dictionary 2 in the dictionary memory 16.

Thus, when the first image and the second image have been registered formally, it is determined that the registration is success, and the processing is terminated. On the other hand, when it is determined as identification rejection as a result of identification, the processing so far is cleared as a registration failure.

By the multiple dictionary method, the identification processing is performed as follows.

① By fingerprinting, a fingerprint image (identification image) entered through the sensor 12 is binarized in the image processing circuit 14 through the frame memory 13 and stored in the binary memory 15.

② According to a command from the control 20, the dictionary image of dictionary 1 as the dictionary number which is designated from the dictionary memory 16 is transferred to the identification memory 17, and the matching program in the CPU 11 is performed to make pattern matching in the image processing circuit 14 by the binarized image in the binary memory 15 and the dictionary image in the identification memory 17.

③ When the identification is resulted to be identification rejection, the dictionary image of dictionary 2 is used to perform again pattern matching with the binarized image of the binary memory 15 in the image processing circuit 14.

④ When the processing in ② above results in identification acceptance with respect to the dictionary image of dictionary 1 or the processing in ③ above results in identification acceptance with respect to the dictionary image of dictionary 2, the result is noticed as identification success to the control 20.

⑤ When the processing in ② and the processing in ③ are resulted in identification rejection, the results are noticed as identification failure to the control 20.

By adopting the multiple dictionary method into the fingerprint identification device, identification rejection based on the deformation of fingerprints caused at fingerprinting can be prevented, and an identification rate can be improved.

However, the fingerprint is not always invariable but varies due to the following various causes.
(1) Changes over time (age, external injury on fingers)
(2) Changes of placing fingers due to practice Therefore, the fingerprint image entered every time varies gradually with respect to the previously registered dictionary image, and when fingerprinting is made later, it may result in identification rejection. Therefore, it is hard to keep a high identification rate unless the registered dictionary image is renewed at an appropriate opportunity. But, a method of renewing the dictionary image which enables the renewal of the dictionary image has not been proposed.

Another dictionary registration and identification method is known described in, for example, Japanese Patent Laid-Open Publication No. Hei 7-271980.

FIG. 18 shows the outline of a fingerprint identification device to which prior art and the present invention are applied, in which reference numeral 61 denotes a transparent prism type finger stand, 61a a top thereof, 61b an inclined face, and 61c a bottom face thereof. Reference numeral 62 denotes a prism face on which a finger is positioned at the top face of the finger stand 61, and 63 a finger positioned on the prism face. Reference numeral 64 denotes a lamp to illuminate the finger 63 from below the bottom face 61c of the finger stand 61. Reference numeral 65 denotes an image pickup device to take a picture of the finger 63 from the side of the inclined face 61b of the finger stand 61. Reference numeral 66 denotes a fingerprint identification control for controlling the lamp 64 and the image pickup device 65 to identify the fingerprint. In the fingerprint identification control 66, reference numeral 67 denotes an image processing unit for processing the fingerprint image taken from the image pickup device 65, 68 a fingerprint registering unit for registering the collected fingerprint images as the dictionary, and 69 an identifying unit for identifying the pictured fingerprint image with the registered dictionary images to judge matching.

The prism face 62 of the finger stand 61 is illuminated through the finger stand 61 from below the bottom face 61c by the lamp 64. The finger 63 is put on and pressed against the prism face 62 to contact fingerprint ridges to the prism face 62. When this sate is viewed from the inclined face 61b of the finger stand 61, the fingerprint ridges have a light reflection factor different from other parts, so that the fingerprint image formed on the prism face 62 can be pictured from the inclined face 61b of the finger stand 61 by the image pickup device 65 such as a TV camera.

The pictured fingerprint image is processed by the image processing unit 67 in the fingerprint identification control 66 to make it easy to compare minutiae, and identified by the identifying unit 69 with the minutiae of the fingerprints registered in the form of the dictionary image in the fingerprint registering unit 68. And, when a prescribed number or more of minutiae are detected to match with the entered fingerprint image, it is judged as identification pass. The minutiae of the fingerprint are extracted in view of the ending points and bifurcation points of the fingerprint ridges.

Before starting the identification of a fingerprint, it is necessary to make sure that the finger 63 is on the finger stand 61. Therefore, a fingerprinting judging process is performed to judge that fingerprinting has been made.

FIG. 19 shows the flowchart of a conventional fingerprinting judging process in the fingerprint identification device. In identifying the fingerprint, the device first requires that the fingerprint is affixed. After determining that the first fingerprinting has been made, a fingerprint image is taken and identified with the registered fingerprint images. When the identification is resulted in identification pass, processing as identification success is performed, and, for example, prescribed processing such as permission for entrance is made.

When the first fingerprinting results in identification rejection, fingerprinting is required again, and a fingerprint image is taken to perform identification processing. When it results in identification rejection, the same procedure is repeated, and if the third identification processing results in identification rejection, processing as identification failure is performed, and, for example, processing such as prohibition against entrance is made.

In the conventional fingerprinting judging process shown in FIG. 19, when the identification results in identification rejection, fingerprinting is required again and a fingerprint image is taken accordingly, the finger on the finger stand remains as it is and kept in close contact with the fingerprinting surface (prism face 2) through the three identifications.

When the first identification results in identification rejection and fingerprinting is required again by the fingerprint identification device, if the finger is continuously in close contact with the fingerprinting surface from the first fingerprinting, the fingerprint image taken upon another requirement for fingerprinting is almost the same as the fingerprint image taken first. Therefore, when the first-taken fingerprint image results in identification rejection, it is highly possible that the second-taken fingerprint image also results in identification rejection.

Therefore, in the second fingerprinting, if it is urged that the finger is separated from the fingerprinting surface after the first fingerprinting and then positioned on the fingerprinting surface for fingerprinting again, it may be highly possible that the fingerprint image taken by the second fingerprinting results in identification pass, but such a method has not been adopted.

And, when the finger is positioned on the fingerprinting surface before the first fingerprint image collection and kept thereon through a plurality of fingerprint image collections in the same way as by the conventional method, fingerprinting time becomes long, the finger skin stretches or shrinks to deform the fingerprint image, and an identification rate is lowered. Besides, when the finger on the fingerprinting stand is not in position, the fingerprint is partly deformed, fingerprinting time becomes long, the fingerprint image is heavily deformed, and an identification rate is lowered.

Since the fingerprint image is taken in immediately after checking the fingerprinting by the device, it is felt that the fingerprint image is taken immediately when the finger is put on the fingerprinting surface. Therefore, when the finger is separated from the fingerprinting surface after each fingerprinting as in the method of the present invention, timing for taking the fingerprint image after fingerprinting can be kept constant and it can be taken in a short time after fingerprinting, so that the identification rate at the first fingerprinting and that at the second fingerprinting can be kept same by providing the same conditions for taking fingerprints. But, such a method has not been proposed.

FIG. 20 is an explanatory view of the fingerprint image pickup unit, in which reference numeral 71 denotes a camera, 72 a light source, 73 a prism, 74 an elastic film, and 75 a finger subject to fingerprinting. The camera 71 can be a CCD camera, for example. When it is provided at an angle of critical angle $\theta$ or below with respect to the fingerprinting surface (the surface of the elastic film 74) and the fingerprinting surface is illuminated through the prism 73 by the light source 72, the reflected light does not enter the camera 71 if the finger 75 is not in position. And, when the finger 75 is put on the elastic film 74 on the fingerprinting surface, the reflected light which corresponds to the ridge and valley lines forming the fingerprint of the finger 75 enters the camera 71, and a signal of the pictured fingerprint is outputted from the camera 71.

And, the elastic film 74 serves to improve the adhesion with the finger 75 and to enable to take a clear picture of the fingerprint of even a dry finger, and is required to have abrasion resistance to some extent. And, there is not any colorless transparent material available. Accordingly, when external intense light enters the fingerprinting surface, scattered light may be produced by the elastic film 74 and entered into the camera 71. And, if the elastic film 74 is scratched or made dirty, reflected light is produced by the light from the light source 72 and entered into the camera 71.

In the fingerprint identification device, the finger 75 is positioned on the fingerprinting surface (the elastic film 74) and the fingerprint is pictured by the camera 71. And it is necessary to judge whether or not the image signal from the camera 71 is derived from the fingerprint image. Therefore, in the conventional fingerprint identification device, for example, a method (a) is known in which when the finger is positioned on the fingerprinting surface, the reflected light from the finger enters the camera 71, average luminance within a judging area used to identify the fingerprint in the pictured screen by the camera 71 is determined, and when the average luminance exceeds a predetermined threshold, it is presumed that the reflected light from the finger 75 has entered the camera 71, it is judged that fingerprinting has been made, and the fingerprint image signal at the time is taken to make the registration or identification of the fingerprint.

A method (b) is also known in which the judging area is divided into a plurality of blocks, and when the number of blocks which have the average luminance of respective blocks exceeding a threshold exceeds a prescribed value, it is judged as a fingerprinting state. And, as to the number of blocks in the judging area, when it is assumed that the number of blocks in the judging area is j, the number of picture elements in the block is m, and luminance of the picture elements in the judging area is Pqn, average luminance A q of a certain block is expressed as follows.

$$Aq = \left(\sum_{n=1}^{n=m} Pqn\right) / m \quad (1)$$

And, a method is also known in which a total of blocks satisfying the average luminance A q larger than a certain threshold a is determined and regarded as N, and when the total N becomes larger than a certain threshold b, it is judged that fingerprinting has been made.

In the conventional method (a) that it is judged that fingerprinting has been made when the average luminance in the judging area exceeds the threshold, if intense light such as direct sunlight enters the fingerprinting surface, the scattered light from the elastic film 74 enters the camera 71 to make the entire picture white, and the average luminance is increased. In other words, an error is caused in judging the fingerprinting.

And, in the conventional method (b) that it is judged that fingerprinting has been made when numeral N indicating the number of times that the average luminance of respective blocks in the judging area exceeds the threshold a is determined and exceeds the threshold b, lighting nonuniformity can be compensated, but in the same way as the conventional method (a), the average luminance of respective blocks is increased when intense light enters the fingerprinting surface, an error occurs in judging fingerprinting.

SUMMARY OF THE INVENTION

It is an object of the invention that in a fingerprint identification device, match data at the time of performing multiple number of times of identification on all minutia data in dictionary data is stores, priorities are determined according to the match data at a certain time to arrange the minutia data in a different sequence, so that time required to result in identification acceptance is shortened, dictionary identification can be made quickly, and an identification match rate (acceptance rate) can be prevented from being lowered due to the cancellation of the identification because of continuous identification mismatch.

It is another object of the invention that for a fingerprint identification device, a dictionary image renewing method is provided to renew registered dictionary images to secure the best dictionary images all the time, thereby retaining a high identification rate.

It is another object of the invention that in a fingerprint identification device, multiple dictionaries are registered to perform identification, and at the time of registering, more stable multiple dictionary images can be obtained readily, and at the time of identifying, the identification processing with the multiple dictionaries can be made readily.

It is another object of the invention that for a fingerprint identification device, a fingerprinting judging method is provided by which at the time of capturing a fingerprint =image to be identified, fingerprinting is made from a state that a fingerprint has not been affixed, the obtained fingerprint image is captured as an image for fingerprint identification, so that identification rejection of the affixed fingerprint is prevented from being repeated due to the deformation of the fingerprint caused when the fingerprinting state is continued for a long period of time, timing of capturing the fingerprint image after fingerprinting can be made constant, and the capturing can be made in a short time of period after fingerprinting.

It is another object of the invention to provide a fingerprint identification device and a fingerprinting judging method which prevent an error in judging fingerprinting.

A dictionary image renewing method in a fingerprint identification device according to the invention has a given number of dictionary data having a plurality of arranged minutia data in a fingerprint image, performs pattern matching between an entered fingerprint image and the multiple minutia data in the dictionary data, and detects the matching between the entered fingerprint image and the dictionary data according to the matching with a prescribed number of minutia data, wherein match data which indicates the number of times of matching with the entered fingerprint image is provided in the respective minutia data, and arranges the respective minutia data, which form the dictionary data, in the order from the greater match data when pattern matching is performed between all minutia data and the entered fingerprint images for a prescribed period.

In the dictionary image renewing method in a fingerprint identification device according to the invention, dictionary data having a plurality of minutia data arranged is provided, pattern matching is performed between an entered fingerprint image and the multiple minutia data, and the matching between the entered fingerprint image and the dictionary data is detected when a prescribed number of minutia data has matched.

In the dictionary image renewing method in a fingerprint identification device according to the invention, match data which indicates the number of times of matching with the entered fingerprint image is provided in the respective minutia data. And, pattern matching is performed between all minutia data and the entered fingerprint images for a prescribed period and the order of the respective minutia data is arranged in the order from the greater match data.

By arranging as described above, matching with a prescribed number of minutia data is accelerated, so that the fingerprint image checking time can be shortened. And, when the identification processing is canceled owing to the continuous multiple numbers of mismatches in identification, an identification match rate (acceptance rate) can be prevented from lowering due to the cancellation of identification.

A first dictionary image renewing method in a fingerprint identification device of the present invention registers as dictionaries dictionary images extracted from a plurality of fingerprint images determined as identification acceptance by mutual identification and uses the multiple dictionaries to perform identification processing of entered fingerprint images, wherein the entered fingerprint images are successively identified with the dictionary images registered in the multiple dictionaries, and when identification is resulted as acceptance with any dictionaries, one dictionary is renewed to the dictionary image registered in the other dictionary, and the other dictionary is renewed to the dictionary image extracted from the input fingerprint image.

A second dictionary image renewing method in a fingerprint identification device according to the present invention registers as dictionaries dictionary images extracted from a plurality of fingerprint images determined as identification acceptance by mutual identification and uses the multiple dictionaries to perform identification processing of entered fingerprint images, wherein the entered fingerprint images are successively identified with the dictionary images registered in the multiple dictionaries, and when identification is resulted as acceptance with both dictionaries, one dictionary is renewed to the dictionary image registered in the other dictionary, and the other dictionary is renewed to the dictionary image extracted from the input fingerprint image; and when identification is resulted as acceptance with one dictionary and rejection with the other dictionary, the dictionary which is resulted in the rejection is renewed to the dictionary image extracted from the entered fingerprint image.

A third dictionary image renewing method in a fingerprint identification device according to the present invention registers as dictionaries dictionary images extracted from a plurality of fingerprint images determined as identification acceptance by mutual identification and uses the multiple dictionaries to perform identification processing of entered fingerprint images, wherein the entered fingerprint images are successively identified with the dictionary images registered in the multiple dictionaries, and when identification is resulted as acceptance with any dictionaries, dictionaries other than one registered first are renewed to the dictionary image extracted from the entered fingerprint image.

A fourth dictionary image renewing method in a fingerprint identification device according to the present invention registers dictionary images extracted from multiple fingerprint images which have been judged as acceptance by mutual identification as a main dictionary and a sub-dictionary and uses the main dictionary to perform identification processing of an entered fingerprint image, wherein when the entered fingerprint image is identified with the main dictionary, identification with the sub-dictionary is also performed to renew an identification match rate of each dictionary, and the sub-dictionary is replaced by the main dictionary when the identification match rate of the sub-dictionary exceeds the identification match rate of the main dictionary.

In the first dictionary image renewing method in a fingerprint identification device of the present invention, the dictionary images extracted from the plurality of fingerprint images determined as identification acceptance by mutual identification are registered as dictionaries into a dictionary memory, and these multiple dictionaries are used to identify the entered fingerprint images.

In this case, the entered fingerprint images are successively identified with the dictionary images registered in the multiple dictionaries, and when identification is resulted as acceptance with any dictionaries, one dictionary is renewed to the dictionary image registered in the other dictionary, and the other dictionary is renewed to the dictionary image extracted from the input fingerprint image.

In the first dictionary image renewing method in a fingerprint identification device of the present invention, since the fingerprint identification device always has optimum dictionary images as the dictionary, a high identification rate can be retained, so that an identification rate in the fingerprint identification device can be improved.

In the second dictionary image renewing method in a fingerprint identification device of the present invention, for the fingerprint identification device having a multiple dictionary method same as the first dictionary image renewing method, the entered fingerprint images are successively identified with the dictionary images registered in the multiple dictionaries, and when identification is resulted as acceptance with both dictionaries, one dictionary is renewed to the dictionary image registered in the other dictionary, and the other dictionary is renewed to the dictionary image extracted from the input fingerprint image in the same way as the first dictionary image renewing method.

And, when identification is resulted as acceptance with one dictionary and rejection with the other dictionary, the dictionary which is resulted in the rejection is renewed to the dictionary image extracted from the entered fingerprint image.

In the second dictionary image renewing method of the present invention, since the fingerprint identification device always has optimum dictionary images as the dictionary, a high identification rate can be retained, so that an identification rate in the fingerprint identification device can be improved.

In the third dictionary image renewing method in a fingerprint identification device according to the present invention, for the fingerprint identification device having a multiple dictionary method same as the first dictionary image renewing method, the entered fingerprint images are successively identified with the dictionary images registered in the multiple dictionaries, and when identification is resulted as acceptance with any dictionaries, dictionaries other than one registered first are renewed to the dictionary image extracted from the entered fingerprint image.

In the third dictionary image renewing method in a fingerprint identification device according to the present invention, for the fingerprint identification device, since the fingerprint identification device always has optimum dictionary images as the dictionary, a high identification rate can be retained, so that an identification rate in the fingerprint identification device can be improved.

In the fourth dictionary image renewing method in a fingerprint identification device according to the present invention, for the fingerprint identification device, the dictionary images extracted from the multiple fingerprint images which have been judged as acceptance by the mutual identification are registered as the main dictionary and the sub-dictionary, and the main dictionary is used to perform the identification processing of an entered fingerprint image.

In this case, when the fingerprint image is identified with the main dictionary, the identification with the sub-dictionary is also performed to renew the identification match rate of each dictionary. And the sub-dictionary is replaced by the main dictionary when the identification match rate of the sub-dictionary exceeds the identification match rate of the main dictionary.

In the fourth dictionary image renewing method in a fingerprint identification device according to the present invention, for the fingerprint identification device, since the dictionary images are renewed to keep a high match rate all the time, the dictionary images with higher reliability can be obtained as renewed.

A multiple dictionary registration and identification method in a fingerprint identification device according to the present invention comprises a binary memory for holding a binarized input fingerprint image, a minutia extracting means for extracting minutiae from the binarized fingerprint image, a dictionary memory for registering the extracted minutiae as an dictionary image, an identification memory for holding minutiae to be identified, and an identifying means for identifying the binarized image held in the binary memory with the minutiae held in the identification memory, wherein a plurality of fingerprint images on the same finger are mutually identified at the time of registering the dictionary image, the minutiae of the fingerprint image identified as acceptance are registered in the dictionary memory as a dictionary image, and at the time of identifying the entered fingerprint, the entered fingerprint image is identified with the multiple dictionary images, and when identification with any dictionary image results in acceptance, the input fingerprint is judged as identification success.

In the multiple dictionary registration and identification method in a fingerprint identification device according to the present invention, the fingerprint identification device has the binary memory to keep binarized entered fingerprint images, the minutia extracting means to extract the minutiae from the binarized fingerprint images, the dictionary memory to register the extracted minutiae as the dictionary image, the identification memory to keep the minutiae to be identified, the identification means to identify the binarized image held in the binary memory with the minutiae held in the identification memory.

In this case, to register the dictionary image, the minutiae extracted by the minutia extracting means from the first fingerprint image kept by the identification memory and the binarized image of the second fingerprint image on the same finger kept by the binary memory are identified by the identification means, and when determined as identification acceptance, the minutiae of the first fingerprint image and the minutiae extracted by the minutia extracting means from the second fingerprinting image are registered in the dictionary memory as the first and second dictionary images.

And, at the time of identifying the entered fingerprint, the binarized image of the entered fingerprint image kept in the binary memory is identified with the first dictionary image kept in the identification memory, and when determined as identification rejection, it is identified again with the second dictionary image, and when identification with any dictionary image results in identification acceptance, it is judged that the input fingerprint is identified with a fingerprint image previously registered in the fingerprint identification device and judged as identification success.

Besides, the dictionary images to be registered and identified are not limited to the first and second dictionary images described above and can be prescribed multiple numbers. According to the present invention, an identification rate can be improved by registering and identifying multiple dictionaries in the fingerprint identification device.

A fingerprinting judging method in a fingerprint identification device according to the present invention which identifies a fingerprint image taken from a fingerprint with dictionary images to judge its conformity, which comprises checking the presence or not of fingerprinting at the beginning of identification processing, and when the fingerprinting has been made at the beginning of the identification processing, requiring to release a finger, checking the presence or not of fingerprinting after requiring to release the finger, and when it is confirmed by both of the above checks for the presence of fingerprinting that fingerprinting has not been made, requiring to affix a fingerprint, checking again the presence or not of fingerprinting after requiring to affix the fingerprint, and when the fingerprinting is confirmed as a result of the rechecking for fingerprinting, capturing a fingerprint image.

In the fingerprinting judging method in a fingerprint identification device according to the present invention, the fingerprint image taken from an affixed fingerprint is identified with the registered dictionary images to determine as identification acceptance or rejection.

The fingerprinting judging method in a fingerprint identification device according to the present invention has the following steps for finger printing judgment.
(1) The presence of fingerprinting is judged in the first step of the identification processing.
(2) When the fingerprinting has been made in the first step of the identification processing, it is demanded to separate the finger.
(3) After issuing the demand for the finger separation, the presence of fingerprinting is judged.
(4) When it is checked in both (1) and (2) above that the fingerprinting has not been made, a demand for fingerprinting is issued.
(5) After demanding the fingerprinting, the presence of fingerprinting is judged again.
(6) When it is confirmed that fingerprinting has been made as a result of judging the fingerprinting again after demanding the fingerprinting in (5) above, the fingerprint image is captured.

Therefore, according to the fingerprinting judging method in the fingerprint identification device of the present invention, in accordance with the result of identifying a fingerprint in the fingerprint identification device, it can be controlled to prevent identification rejection from continuing.

A fingerprint identification device comprises a fingerprint image pickup unit which receives reflected light from a light source to take a picture; an in-block average luminance calculation unit which divides a fingerprint judging area into a plurality of blocks and calculates average luminance within the blocks according to a multivalued image signal from the fingerprint image pickup unit; a luminance deviation calculation and arrangement unit which determines deviation between the in-block average luminance from the in-block average luminance calculation unit and the luminance of each picture element in the judging area to determine the number of picture elements corresponding to the deviation; a fingerprinting judging unit which judges that fingerprinting has been made for the fingerprint image pickup unit when the number of picture elements within a prescribed range with the deviation near zero does not exceed a threshold for the number of picture elements corresponding to the deviation from the luminance deviation calculation and arrangement unit; and a fingerprint identification unit which identifies the fingerprint based on the multivalued image signal from the fingerprint image pickup unit when the fingerprinting judging unit has judged the fingerprinting state.

A fingerprinting judging method in a fingerprint identification device according to the present invention comprises determining average luminance for every plurality of blocks in a fingerprint judging area based on a multivalued image signal pictured by a fingerprint image pickup unit, determining deviation between the average luminance of the every block and the luminance of picture elements in the blocks, determining the number of picture elements corresponding to the deviation in the judging area as the whole, judging whether the number of picture elements in a prescribed range exceeds a threshold with a point shifted from the point of deviation zero in the direction of the horizontal axis by a prescribed value when the deviation is on the horizontal axis and the number of picture elements on the vertical axis, and when it does not exceed, judging that fingerprinting has been made.

In the fingerprint identification according to the present invention, a multivalued image signal from the fingerprint image pickup unit having a CCD camera is added to an in-block average luminance calculation unit through an interface, the in-block average luminance calculation unit divides the judging area in the image pickup area into a plurality of blocks and calculates average luminance within each block. The luminance deviation calculation and arrangement unit determines deviation between the in-block average luminance and the luminance of each picture element within the pertinent block to process all picture elements in the judging area, and correspondence between the deviation and the number of picture elements is determined. The fingerprinting judging unit, when the number of picture elements within a prescribed range with the deviation near zero exceeds a threshold, judges that external light has entered the fingerprint image pickup unit, and when it does not exceed, judges that fingerprinting has been made with respect to the fingerprint image pickup unit, binarizes in the binarz?ing unit the multivalued image signal from the fingerprint image pickup unit at this time, identifies it in the fingerprint identifying unit with the binarized registered fingerprint in the memory, and outputs the judgment on identification.

In the fingerprinting judging method in the fingerprint identification device according to the present invention, average luminance is determined on every multiple blocks in the fingerprint judging area, deviation between the luminance of each picture element in the block and the in-block average luminance is determined, and the relation between the deviation and the number of picture elements in the entire judging area is determined. And, with the deviation on the horizontal axis and the number of picture elements on the vertical axis, when the external light enters or when the incident light into the fingerprint image pickup unit is small reflected light only, molt of the picture elements have deviation of zero or close thereto with respect to the in-block average luminance, and the number of picture elements close to the deviation zero increases to exceed the threshold. On the other hand, in the fingerprinting state, the reflected light corresponding to the fingerprint enters the fingerprint image pickup unit, so that the number of picture elements close to the deviation zero decreases, the distribution of picture elements has a bimodal characteristic with the neighborhood of the deviation zero as the center, and the number of picture elements in the neighborhood of the deviation zero does not exceed the threshold. And, in contrast to the electrical characteristics of the fingerprint image pickup unit and the structures of respective units, the dispersion characteristic of picture elements with respect to the deviation does not have a symmetric property with the deviation zero as the center, and with a point shifted from the point of deviation zero in the direction of the horizontal axis by a prescribed value as the center, it is judged whether the number of picture elements in a prescribed range has exceeded the threshold.

BRIEF DESCRIPTION OF THE DRAWINGS

FIG. 3 is an explanatory view of arranging minutiae in a different sequence.

BEST MODE FOR CARRYING OUT THE INVENTION

Figure 1:
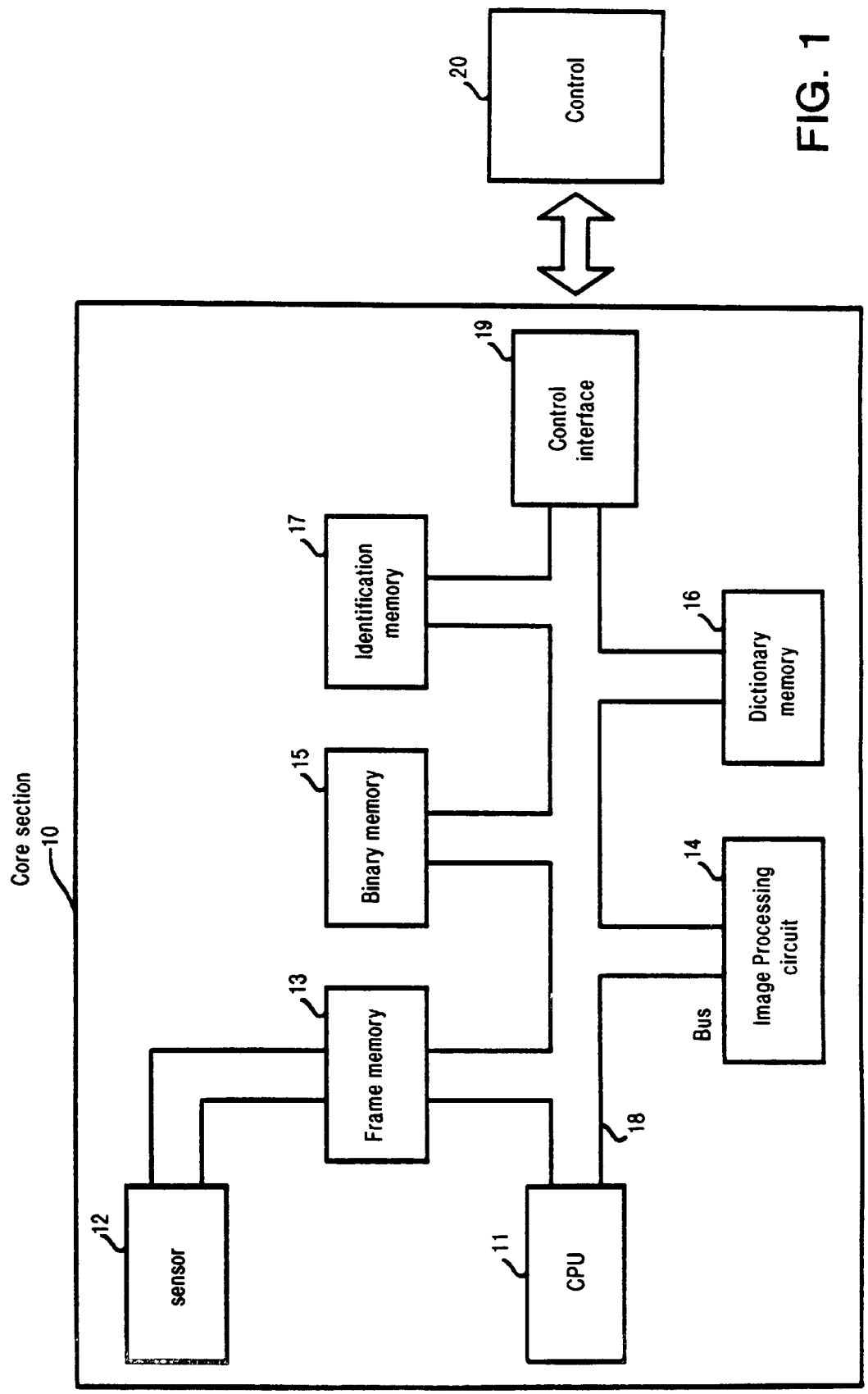
FIG. 1 is a diagram showing a structural example of the fingerprint identification device to which the present invention is applied.

Embodiment 1:

FIG. 1 shows one embodiment of a dictionary image renewing method in the fingerprint identification device according to the present invention is applied. The fingerprint identification device comprises a core section 10 in which a fingerprint image is registered and identified and a control 20 to control the processing in the core section 10. The control by the control 20 is performed by sending a command to the core section 10 and receives from the core section 10 a response to the command.

In the core section 10, reference numeral 11 denotes a central processing unit (CPU) for controlling the processing of registration and identification of fingerprint images. And, reference numeral 12 denotes a sensor for taking the image of a fingerprint which is to be registered and identified. Reference numeral 13 denotes a frame memory for storing the fingerprint image taken from the sensor 12 as a multi-valued image. Reference numeral 14 denotes an image processing circuit for various processing of images, such as binarization of a multivalued image read from the frame memory 13, extraction of minutiae from the binarized image, pattern matching of the binarized image with the minutia data in the dictionary data and the like.

Reference numeral 15 denotes a binary memory for storing a binarized image. Reference numeral 16 denotes a dictionary memory for storing the minutia data extracted from the binarized image as dictionary data. Reference numeral 17 is an identification memory for keeping the minutia data of fingerprints to be used for identification. Reference numeral 18 denotes a bus of the CPU 11 to connect respective parts to the CPU 11. And, reference numeral 19 is a control interface for interfacing of a command and a response between the bus 18 and the control 20.

Figure 2A:
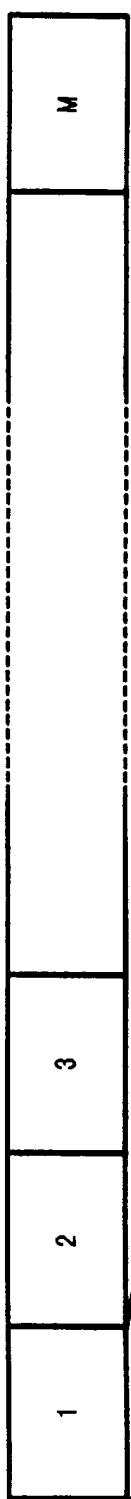
FIG. 2 is a diagram showing the configuration of dictionary data in one embodiment of a dictionary image renewing method in the fingerprint identification method according to the invention, in which (a) shows all dictionary data, (b) one-person dictionary data in the all dictionary data, and (c) one minutia data in the one-person dictionary data.
Figure 2B:
Figure 2C:
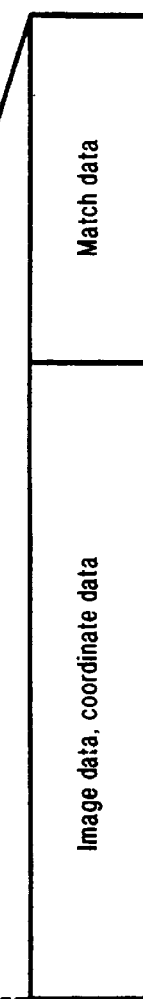
Figure 14A:
FIG. 14 is a diagram showing the configuration of conventional dictionary data, in which (a) shows all dictionary data, (b) one-person dictionary data in the all dictionary data, and (c) one minutia data in the one-person dictionary data.
Figure 14B:
Figure 14C:
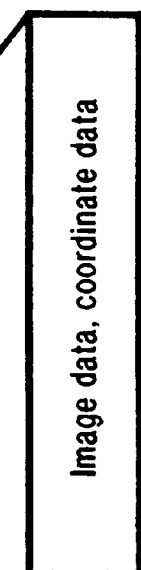
Figure 15A:
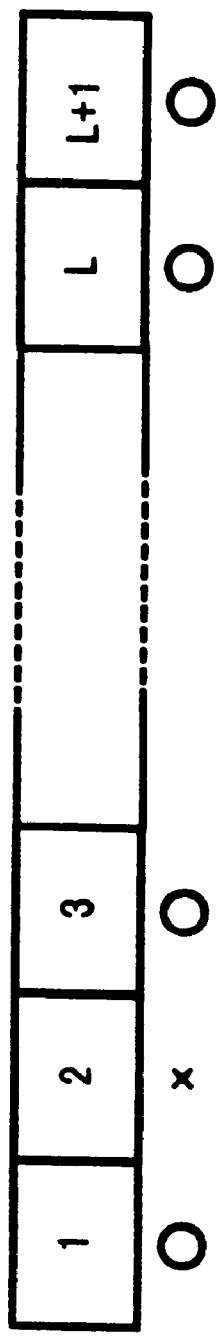
FIG. 15 is a diagram showing an example of identifying minutiae, in which (a) shows example 1 and (b) shows example 2.
Figure 15B:
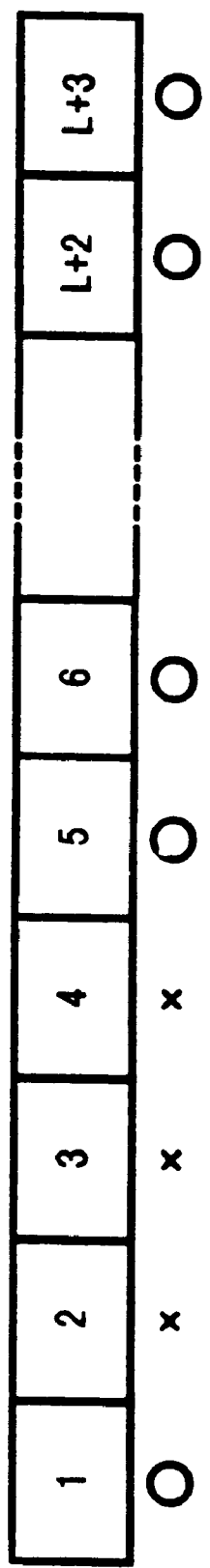
Figure 16:
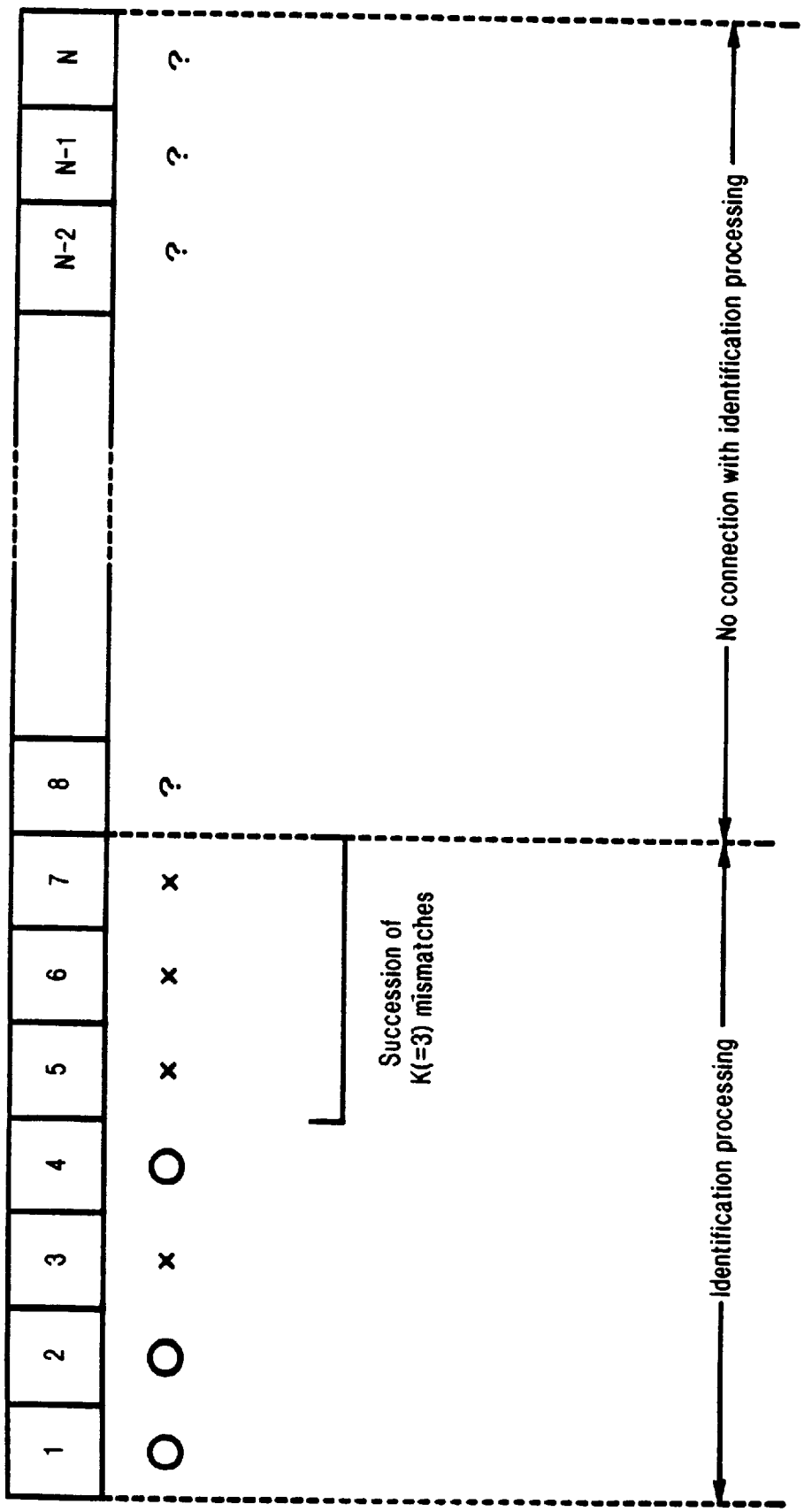
FIG. 16 is a diagram of explaining the cancellation of identification processing.

FIG. 2 shows the configuration of dictionary data according to the invention, in which (a), (b) and (c) correspond to those in FIG. 14 except that in the method according to the invention, matching data indicating a match with an entered fingerprint image is contained in each minutia data.

Identification processing of a fingerprint image according to the method of this invention is performed as follows. First, a command of starting the identification processing is sent from the control 20, and it is read by the core section 10. Then, when a to-be-identified person puts a finger on the sensor 12, a fingerprint image is entered from the sensor 12, and it is taken as a multivalued image into the frame memory 13.

The image processing circuit 14 binarizes the multivalued image which has been taken into the frame memory 13, stores it in the binary memory 15, and transfers the dictionary data with dictionary number designated by the control 20 from the dictionary memory 16 to the identification memory 17. And, pattern matching is performed between the binarized image read from the binary memory 15 and the dictionary data read from the identification memory 17 in order of minutia 1 to minutia N.

In the core section 10, such identification processing is performed sequentially on N number of minutia data, and when L number of minutia data are matched, it is determined as identification pass, and a signal of the completion of identification processing is sent to the control 20.

Besides, in the core section 10, all N number of minutia data are identified, and when patterns are matched, the matched data are increased. The control 20 checks the magnitude of matched data with respect to respective minutia data at a certain time, and changes the arranged order of respective minutia data in order of larger to smaller matched data. Such processing is repeated on every prescribed number of identification processing, for example.

Figures 3A, 3B:
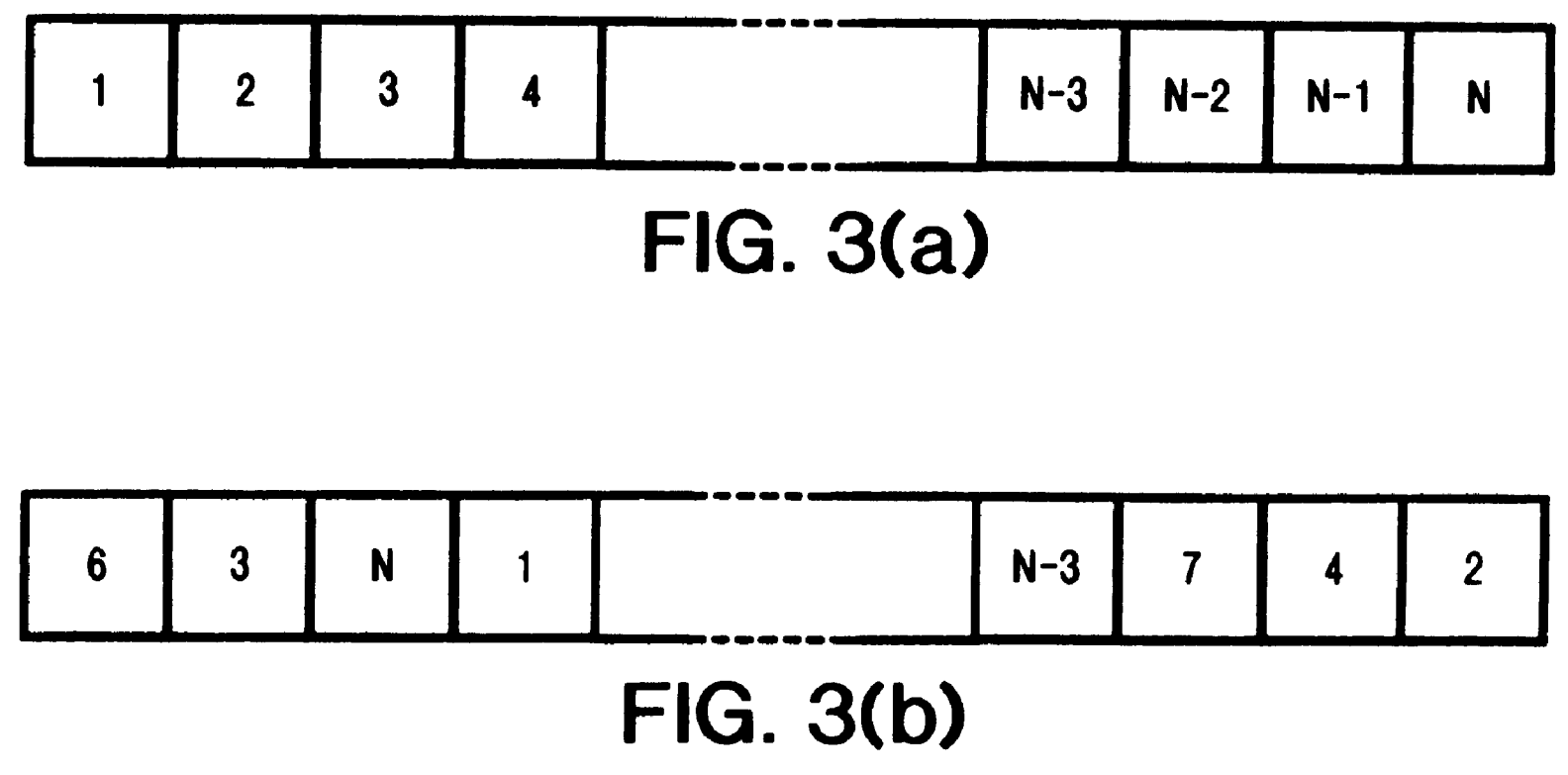

FIG. 3 explains the arrangement of minutiae in a different sequence, in which (a) shows a state before sorting, and (b) a state after sorting. It shows that the dictionary shown in (a) registered in the fingerprint identification device is identified a plurality of times, all minutiae are assigned priorities, and respective minutiae are sorted according to the priorities, resulting in the order as shown in (b).

After arranging the minutia data in the dictionary data in a different sequence as described above, the minutia data in the dictionary data is arranged in an optimum order, so that the minutia data closer to the head of the dictionary data rarely result in identification mismatch in the identification processing of the entered fingerprint image after sorting. Therefore, it is assumed that identification pass can be obtained mostly by pattern matching with the L-th minutia data.

And, as a result of such sorting, the minutia data closer to the head of the dictionary data have lower possibility of continuous occurrence of identification mismatch. Therefore, lowering of an identification match rate (acceptance rate) is lowered because the identification processing is canceled owing to the continuous occurrence of identification mismatch with K number of minutia data.

Figure 4A:
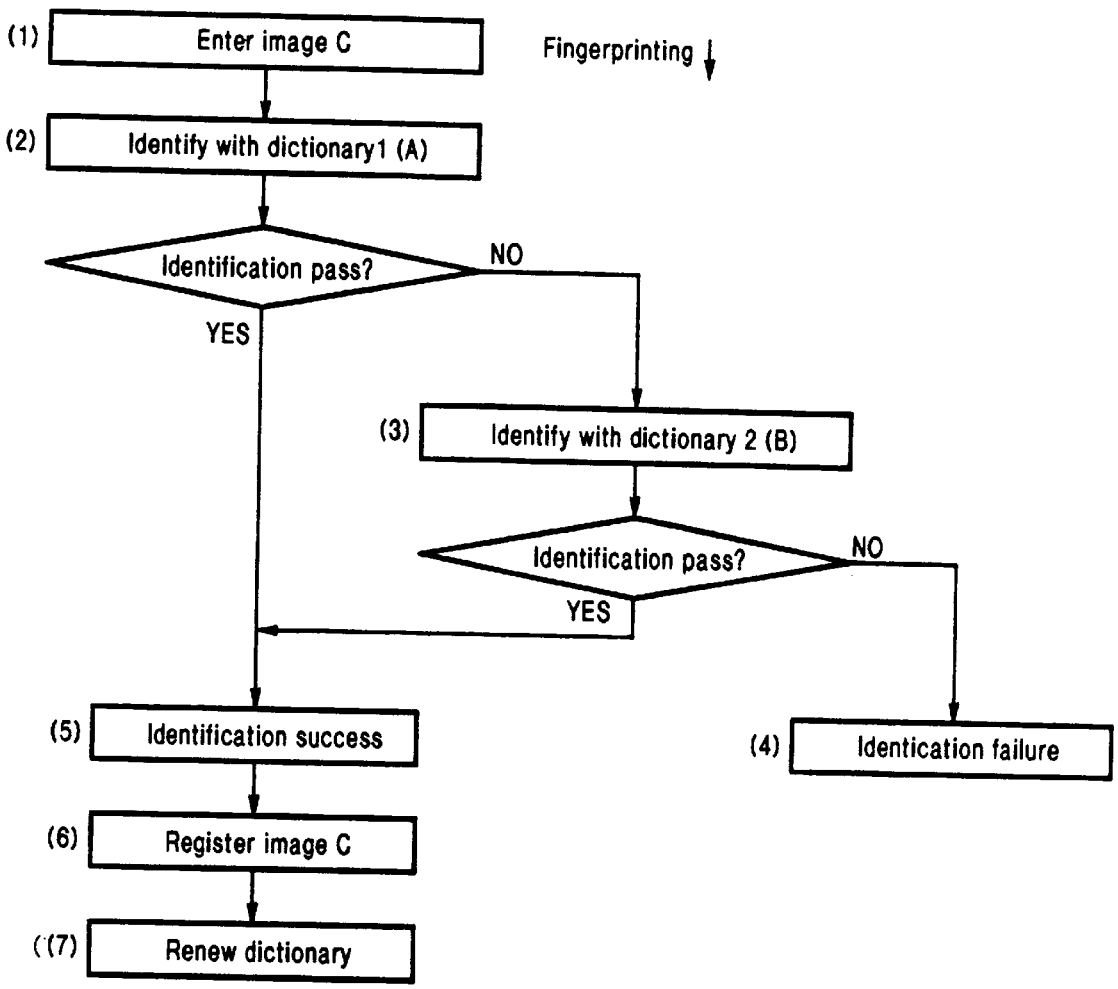
FIG. 4 is diagrams showing one embodiment of a dictionary image renewing method in the fingerprint identification device according to the invention, in which (a) is a flowchart, and (b) is an explanatory diagram of renewing the contents of each dictionary.

Embodiment 2:

FIG. 4 shows one embodiment of a dictionary image renewing method in the fingerprint identification device according to the invention, particularly showing a dictionary image renewing method by the latest fingerprint image determined as identification pass, in which (a) is a flowchart, and (b) is an explanatory diagram of renewing the contents of each dictionary.

In FIG. 4, (1) to (7) show respective steps in the dictionary renewing processing. It is assumed that dictionary image A is registered in dictionary 1 and dictionary image B in dictionary 2 in the following processing.

(1) It is assumed that fingerprint image C is entered by fingerprinting in the identification processing.

(2) First, identification processing with the fingerprint image C is performed using the dictionary image A of the dictionary 1.

(3) When the identification processing using the dictionary 1 results in identification rejection, the identification processing with the fingerprint image C is performed using the dictionary image B of the dictionary 2.

(4) If the identification processing using the dictionary 1 and the dictionary 2 results in identification rejection, it is determined as identification failure, and the dictionary image is not renewed.

(5) If one of the identification processing using the dictionary image A of the dictionary 1 and the identification processing using the dictionary image B of the dictionary 2 results in identification pass, it is determined as identification success.

(6) The minutiae are extracted from the fingerprint image C and registered as a dictionary image.

(7) The dictionary images are renewed.

Figure 4B:
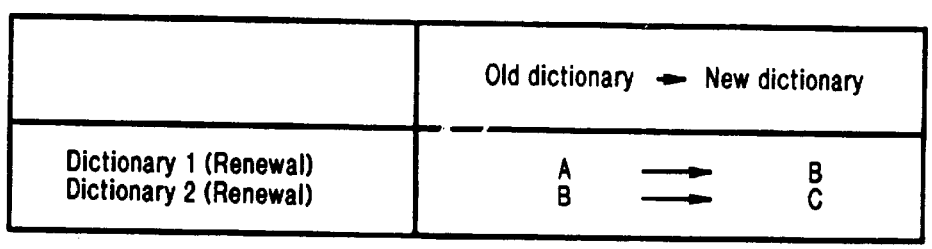

In this dictionary image renewing method, the content of the dictionary 1 is changed from the previously registered dictionary image A to the dictionary image B registered in the dictionary 2, and the content of the dictionary 2 from the previously registered dictionary image B to the new dictionary image C as shown in FIG. 4(b).

In this embodiment, the contents of the dictionary 1 and the dictionary 2 are always the latest dictionary images, and even if the fingerprint form, the way of positioning a finger or the like changes gradually, the fingerprint identification device can keep a high identification rate because the dictionary image also changes accordingly.

Figures 5A, 5B:
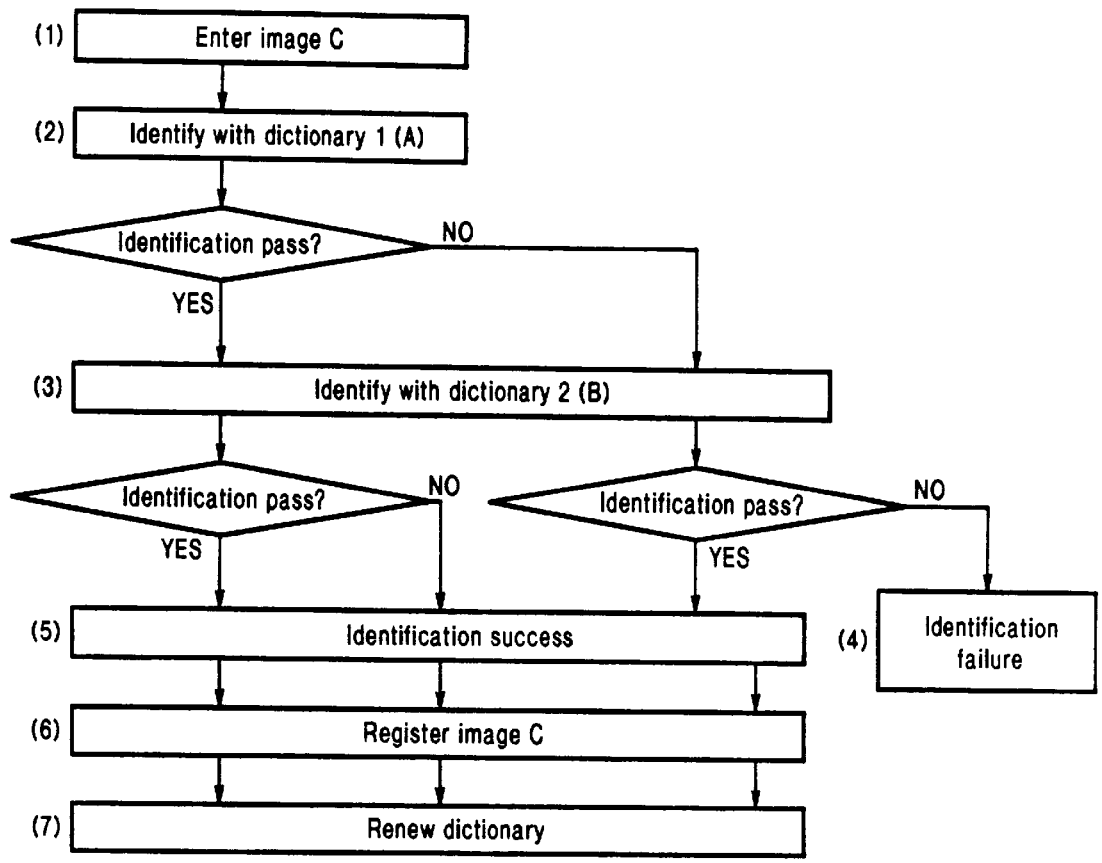
FIG. 5 is diagrams showing one embodiment of a dictionary image renewing method in the fingerprint identification device according to the invention, in which (a) is a flowchart, and (b) is an explanatory diagram of renewing the contents of each dictionary.

Embodiment 3:

FIG. 5 shows one embodiment of a dictionary image renewing method in the fingerprint identification device of the invention, particularly showing a dictionary image renewing method by the latest fingerprint image determined as identification pass, in which (a) is a flowchart, and (b) is an explanatory diagram of renewing the contents of each dictionary.

In FIG. 5 (*a*), (1) to (7) show respective steps in the dictionary renewing processing.

In FIG. 5 (*b*), ○ indicates identification pass, and x indicates identification rejection.

It is assumed that dictionary image A is registered in dictionary 1 and dictionary image B in dictionary 2 in the following processing.

(1) It is assumed that fingerprint image C is entered by fingerprinting in the identification processing.
(2) First, identification processing with the fingerprint image C is performed using the dictionary image A of the dictionary 1.
(3) When the identification processing using the dictionary 1 results in identification pass or identification rejection, the identification processing with the fingerprint image C is performed using the dictionary image B of the dictionary 2.
(4) If the identification processing using the dictionary 1 and the dictionary 2 results in identification rejection, it is determined as identification failure, and the dictionary image is not renewed.
(5) If both of the identification processing using the dictionary image A of the dictionary 1 and the identification processing using the dictionary image B of the dictionary 2 result in identification pass or one of the identification processing using the dictionary image A of the dictionary 1 and the identification processing using the dictionary image B of the dictionary 2 results in identification pass, it is determined as identification success.
(6) The minutiae are extracted from the fingerprint image C and registered as a dictionary image.
(7) The dictionary images are renewed.

In this dictionary image renewing method, when both of the identification processing by the dictionary image A of the dictionary 1 and the identification processing by the dictionary image B of the dictionary 2 result in identification pass as shown in FIG. 5 (*b*), the content of the dictionary 1 is changed from the previously registered dictionary image A to the dictionary image B registered in the dictionary 2, and the content of the dictionary 2 from the previously registered dictionary image B to the new dictionary image C in the same way as in Embodiment 2.

And, when one of the identification processing using the dictionary image A of the dictionary 1 and the identification processing using the dictionary image B of the dictionary 2 results in identification pass, the content of the dictionary which has resulted in identification rejection is renewed to the new dictionary image C.

In this embodiment, the contents of the dictionary 1 and the dictionary 2 are always the latest dictionary images, and even if the fingerprint form, the way of positioning a finger or the like changes gradually, the fingerprint identification device can keep a high identification rate because the dictionary image also changes accordingly.

Figure 6A:
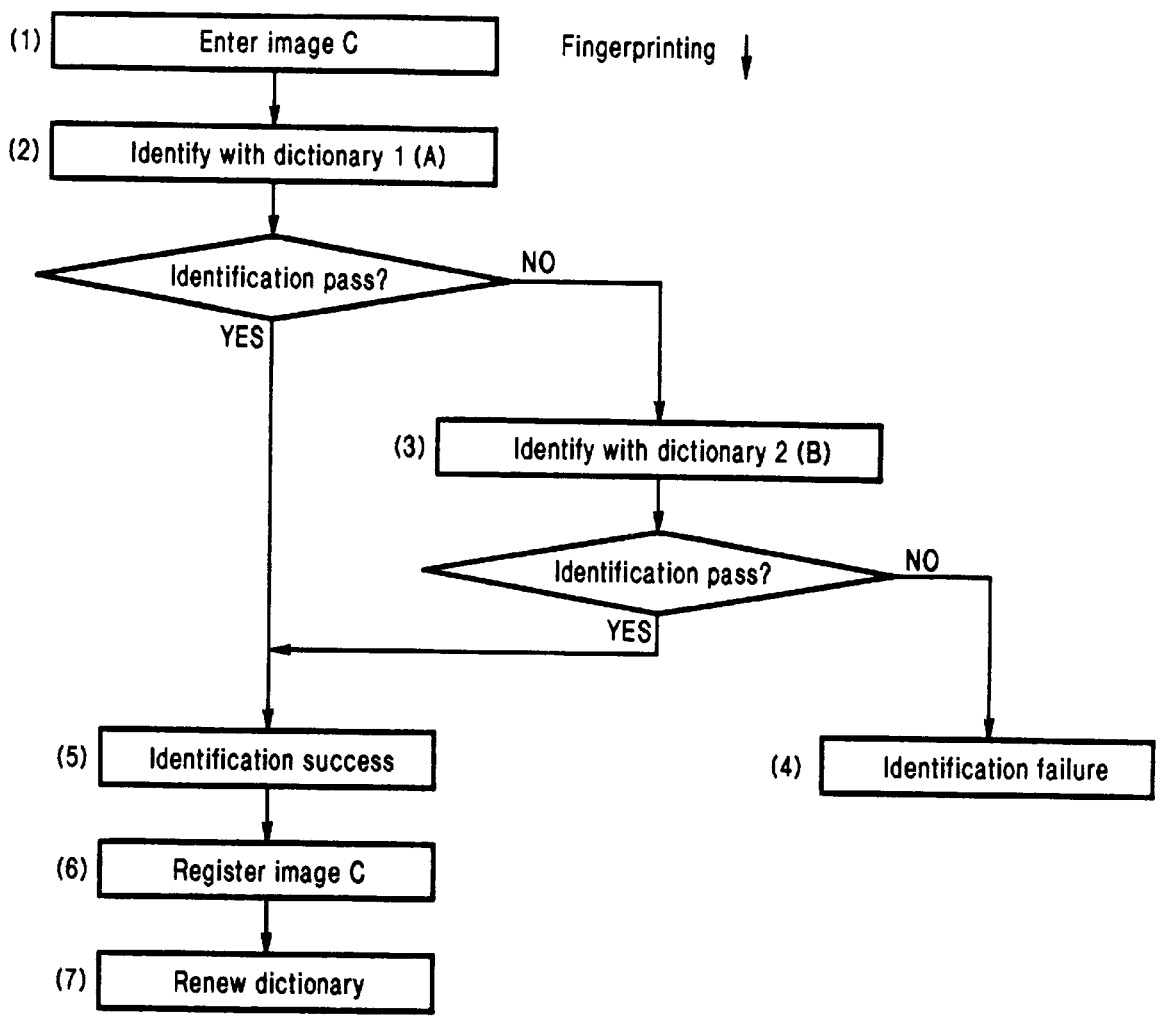
FIG. 6 is diagrams showing one embodiment of a dictionary image renewing method in the fingerprint identification device according to the invention, in which (a) is a flowchart, and (b) is an explanatory diagram of renewing the contents of each dictionary.
Figure 6B:
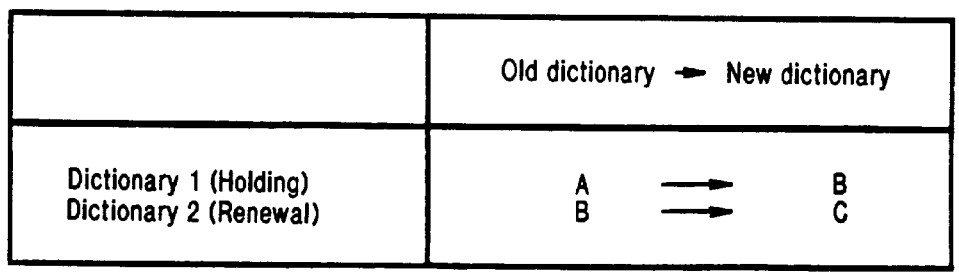

Embodiment 4:

FIG. 6 shows one embodiment of a dictionary image renewing method in the fingerprint identification device of the invention, particularly showing a method of keeping the content of the first dictionary with the firstly registered dictionary image and having the content of the second dictionary as the dictionary image according to the latest fingerprint image of identification pass, in which (a) is a flowchart, and (b) an explanatory diagram of renewing the contents of respective dictionaries.

In FIG. 6 (*a*), (1) to (7) show respective steps in the dictionary renewing processing.

It is assumed that dictionary image A is registered in dictionary 1 and dictionary image B in dictionary 2 in the following processing.

(1) It is assumed that fingerprint image C is entered by fingerprinting in the identification processing.
(2) First, identification processing with the fingerprint image C is performed using the dictionary image A of the dictionary 1.
(3) When the identification processing using the dictionary 1 results in identification rejection, the identification processing with the fingerprint image C is performed using the dictionary image B of the dictionary 2.
(4) If the identification processing using the dictionary 1 and the dictionary 2 results in identification rejection, it is determined as identification failure, and the dictionary image is not renewed.
(5) If one of the identification processing using the dictionary image A of the dictionary 1 and the identification processing using the dictionary image B of the dictionary 2 results in identification pass, it is determined as identification success.
(6) The minutiae are extracted from the fingerprint image C and registered as a dictionary image.
(7) The dictionary images are renewed.

In this dictionary image renewing method, the content of the dictionary 1 is kept as the previously registered dictionary image A, and the content of the dictionary 2 is changed from the previously registered dictionary image B to the new dictionary image C as shown in FIG. 6 (*b*).

In this embodiment, the content of the first dictionary remains same, but the content of the second dictionary is always the latest dictionary image. And, even if an accidental change occurs in the fingerprint form due to an external injury or the like, when it is determined as identification pass once, its content is renewed, and as the external injury cures, the renewal is made accordingly, and the dictionary is renewed according to the change of the fingerprint form until it returns to the original form. Therefore, in this embodiment, even when the finger form changes, the dictionary image changes accordingly, so that a high identification rate can be kept. And, since the content of the first dictionary does not change, it is highly possible that the first dictionary has a higher identification rate when the fingerprint form has fully returned to the original state. The method of this embodiment is effective against not only an external injury but also changes with age and a way of positioning a finger.

Embodiment 5:

As one embodiment of a dictionary image renewing method in the fingerprint identification device according to the invention, description will be made of a dictionary image renewing method using a main dictionary and a sub-dictionary according to the latest fingerprint image which has been determined as identification pass.

The main dictionary is a dictionary used for identification processing, and the sub-dictionary which is managed together with the main dictionary is a dictionary not used for identification processing.

In this embodiment, the dictionary image is renewed according to the following procedure for identification processing.

(1) A fingerprint image is entered by fingerprinting.
(2) The main dictionary is used to make identification processing with the entered fingerprint image and to judge acceptance or rejection.
(3) Identification processing is made with all sub-dictionaries to detect matching or mismatching.
(4) The matched result is added to the identification match rate of the existing sub-dictionary to renew and record.
(5) Through several times of identification processing, when there is a sub-dictionary having a match rate higher than the match rate of the main dictionary at some point in time, its content is renewed into the main dictionary.

In this embodiment, the main dictionary for judging identification acceptance by identification processing can be always kept as a dictionary having the highest match rate.

When there are a plurality (n) of main dictionaries and any of the main dictionaries matches in judging acceptance, identification is determined to be acceptance, and in renewing the dictionary, all sub-dictionaries having a match rate higher than the match rates of the main dictionaries are determined as the main dictionaries, and if the number of such sub-dictionaries is more than n, n number of sub-dictionaries having a high match rate may be selected as the main dictionary.

And, a sub-dictionary can be produced from the image taken in every new identification processing at the time of renewing the main dictionary. Thus, new images can be provided as candidates for the main dictionary whenever necessary.

The dictionary image renewed in this embodiment always have a higher match rate, and renewal never lowers a match rate. Therefore, a dictionary image having higher reliability can be obtained whenever renewed.

Figure 7:
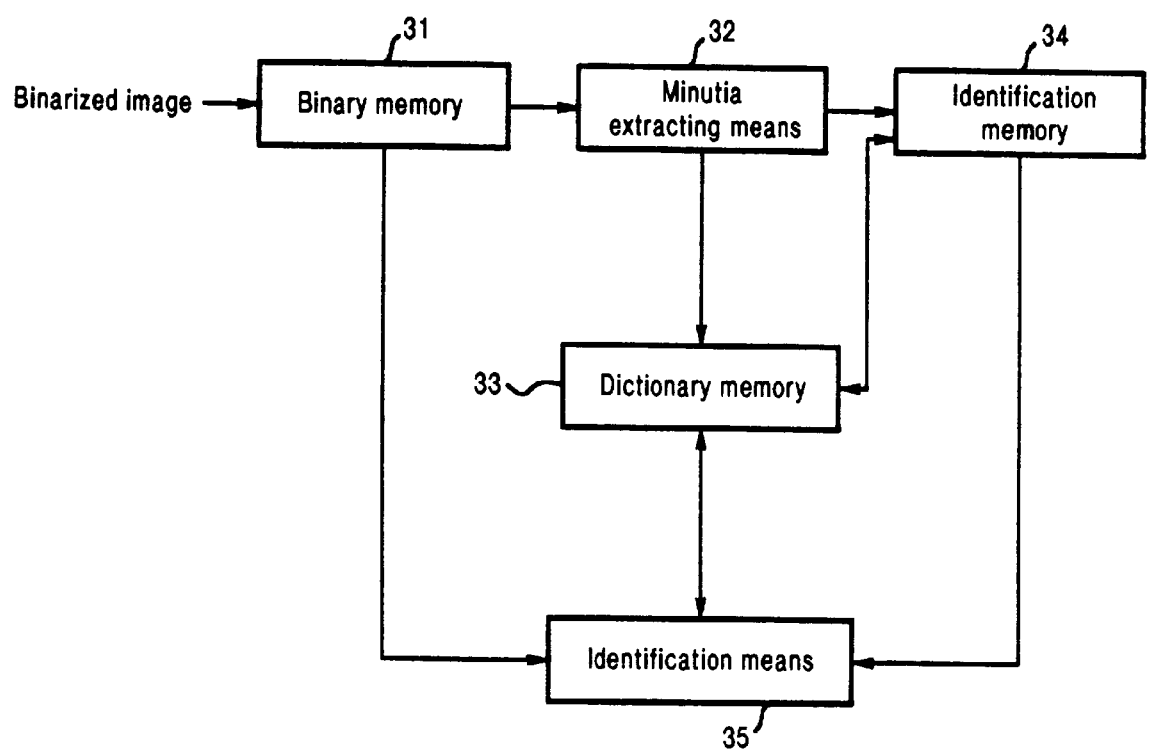
FIG. 7 is a diagram showing the principle configuration of a multiple dictionary registration and identification method in the fingerprint identification device according to the invention.

Embodiment 6:

FIG. 7 shows the principle configuration of a multiple dictionary registration and identification method in the fingerprint identification device according to the invention. The configuration of the fingerprint identification device to which the present invention is applied is the same as one shown in FIG. 1. As to respective elements shown in the principle structure of the present invention, a binary memory 31 corresponds to the binary memory 15 shown in FIG. 1, a minutia extracting means 32 to the image processing circuit 14, the CPU 11 and the minutia extracting program in the CPU 11, a dictionary memory 33 to the dictionary memory 16, an identification memory 34 to the identification memory 17, and an identification means 35 to the CPU 11 and the identification processing program in the CPU 11.

Figure 8A:
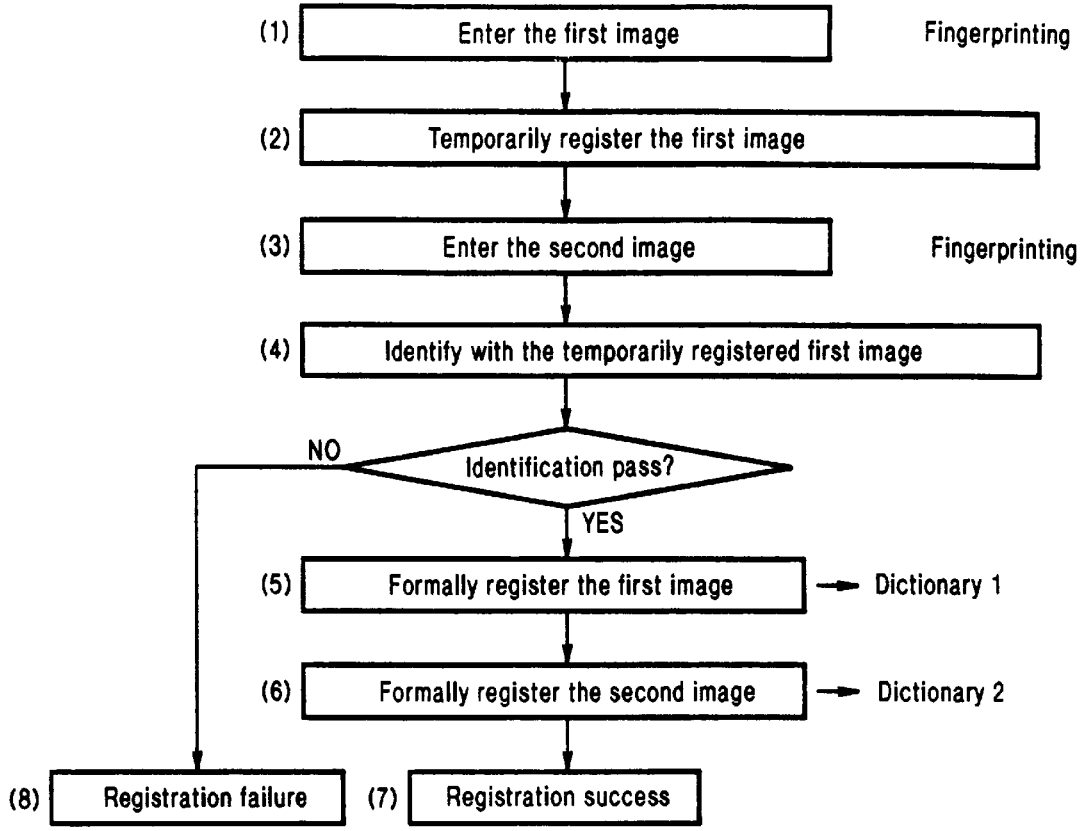
FIG. 8 is a diagram showing one embodiment of a multiple dictionary registration and identification method in the fingerprint identification device according to the invention, in which (a) is a registration processing, and (b) shows an identification processing.
Figure 8B:
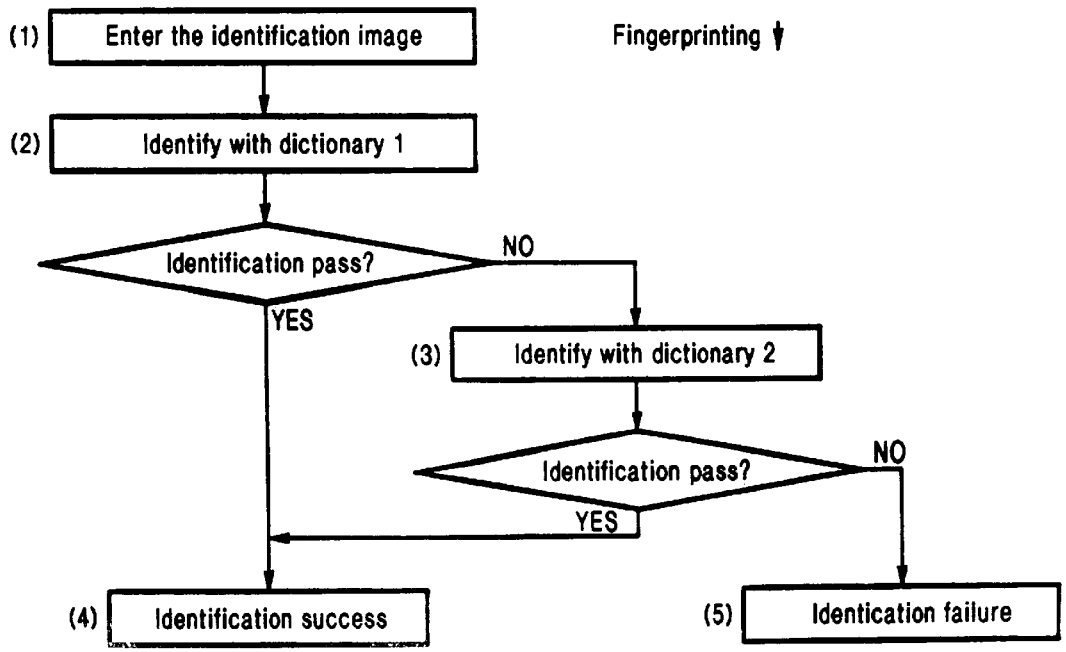

FIG. 8 is one embodiment of the present invention, showing flowcharts of registration processing and identification processing in the fingerprint identification device using multiple dictionaries, in which (a) is a registration processing, and (b) shows an identification processing.

The registration processing in this embodiment is performed as follows.

Figure 17A:
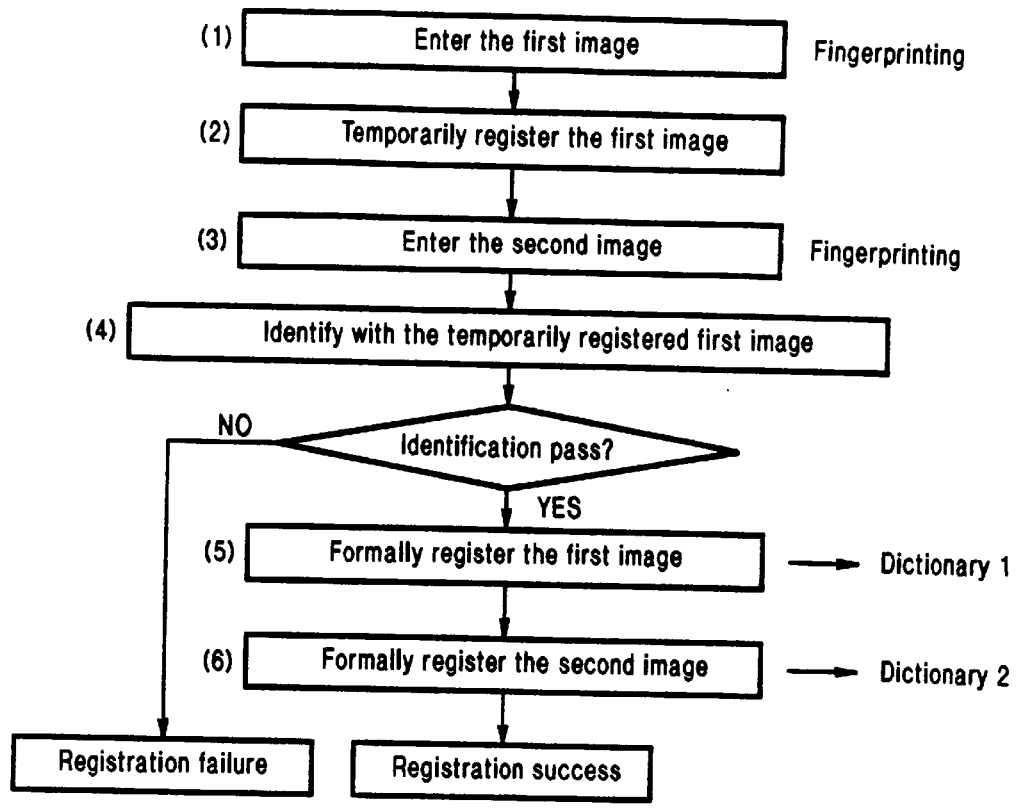
FIG. 17 is a diagram showing flowcharts of registration and identification processing by a conventional multiple dictionary method, in which (a) is a registration processing, and (b) shows an identification processing.
Figure 17B:
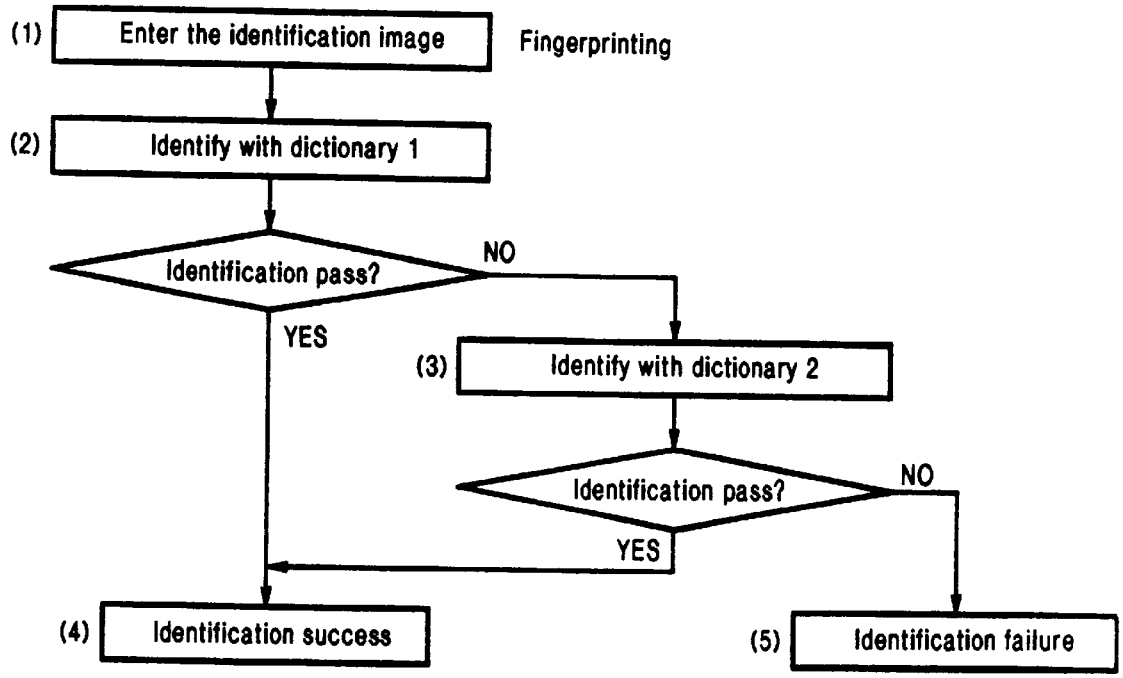

① In the same way as the prior art (1) shown in FIG. 17, when a fingerprint is taken, a fingerprint image (first image) entered through the sensor 12 is binarized in the image processing circuit 14 through the frame memory 13, and stored in the binary memory 15.

② In the same way as the prior art (2) shown in FIG. 17, from the binarized image stored in the binary memory 15, minutiae are extracted in the image processing circuit 14 by running the minutia extracting program in the CPU 11 to temporarily register as a dictionary image in the identification memory 17.

③ In the same way as the prior art (3) shown in FIG. 17, when a fingerprint is taken again, a fingerprint image (second image) is binarized in the image processing circuit 14 through the sensor 12 and the frame memory 13, and stored in the binary memory 15.

④ In the same way as the prior art (4) shown in FIG. 17, by running the identification processing program in the CPU 11, pattern matching is performed in the image processing circuit 14 in view of the dictionary image (first image) temporarily registered in the identification memory 17 and the binarized image (second image) stored in the binary memory 15.

⑤ When it is determined to be identification pass as a result of identification, the dictionary image for the first image temporarily registered is formally registered as dictionary 1 in the dictionary memory 16.

⑥ Besides, from the binarized image of the second image stored in the binary memory 15, the dictionary image, which is obtained by extracting the minutiae in the image processing circuit 14 by running the minutia extracting program in the CPU 11, is formally registered as dictionary 2 in the dictionary memory 16.

⑦ Upon the formal registration of the first image and the formal registration of the second image, it is determined as registration success and the processing is terminated.

⑧ When it is determined as identification rejection as a result of identification, the processing so far is cleared as a registration failure.

The identification processing in this embodiment is performed as follows.

① In the same way as the prior art (1) shown in FIG. 17, by fingerprinting, a fingerprint image (identification image) entered through the sensor 12 is binarized in the image processing circuit 14 through the frame memory 13 and stored in the binary memory 15.

② In the same way as the prior art (2) shown in FIG. 17, according to a command from the control 20, the dictionary image of dictionary 1 as the dictionary number which is designated from the dictionary memory 16 is transferred to the identification memory 17, and the identification processing program in the CPU 11 is performed to make pattern matching in the image processing circuit 14 by the binarized image in the binary memory 15 and the dictionary image in the identification memory 17.

③ When the identification processing results in identification rejection, the dictionary image of the dictionary 2 is used to make pattern matching with the binarized image in the binary memory 15 again in the image processing circuit 14.

④ When the identification with the dictionary image of the dictionary 1 by the processing in ② above or results in acceptance or the identification with the dictionary image of the dictionary 2 by the processing in ③ above results in acceptance, it is determined as identification success and notified to the control 20.

⑤ If both processing in ② and ③ above result in identification rejection, it is determined as identification failure and notified to the control 20.

The dictionary images are characteristic parts such as ending points and bifurcation points extracted from the image of a fingerprint pressed on the sensor, and when some of such minutiae are detected to match with the entered image, it is determined to be identification pass. But, even when the person and the fingerprint are not different, the dictionary image to be obtained is changed due to very slight displacement of the finger on the fingerprinting surface of the sensor or the magnitude of a force applied for fingerprinting, and the same result is not always obtained. Therefore, the second image which has been determined as identification acceptance by the method of this invention generally does not become the same dictionary image as the first image.

However, the second image is determined as identification acceptance with respect to the first image, so that both the first image and the second image are considered to be within the image which will be always obtained when the respective fingerprints are fingerprinted. Therefore, the dictionary 1 and the dictionary 2 obtained from the first image and the second image are considered to be stable dictionary images.

Accordingly, when fingerprint identification is performed using such multiple dictionary images obtained as described above, identification with any dictionary image is determined as acceptance, and it is determined as fingerprint identification success, then an identification rate can be improved. In this method according to the invention, the dictionary images are not limited to two as shown in the embodiment of FIG. 7, but can be three or more.

Figure 9:
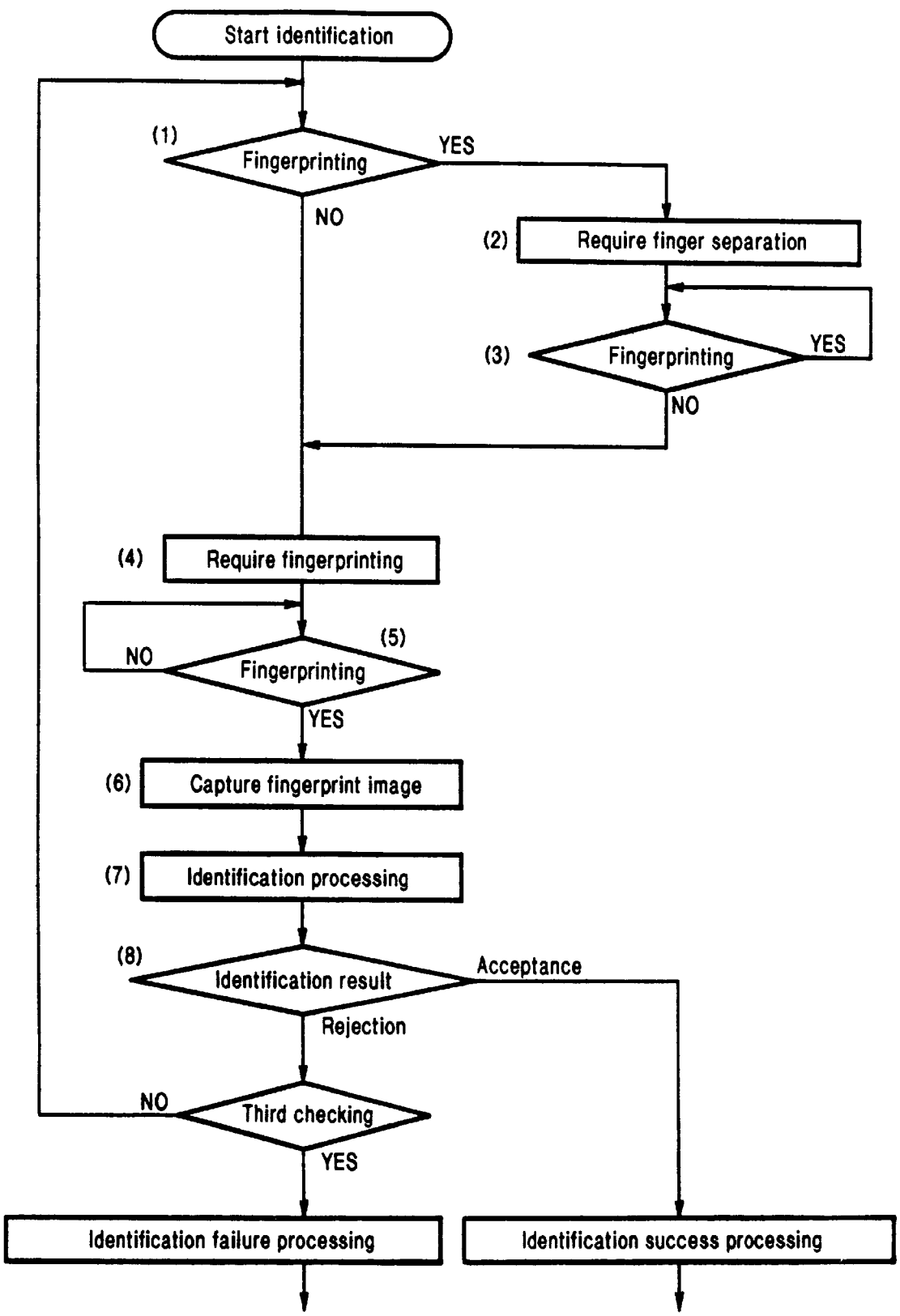
FIG. 9 is a flowchart showing one embodiment of a fingerprinting judging method in the fingerprint identification device according to the invention.
Figure 18:
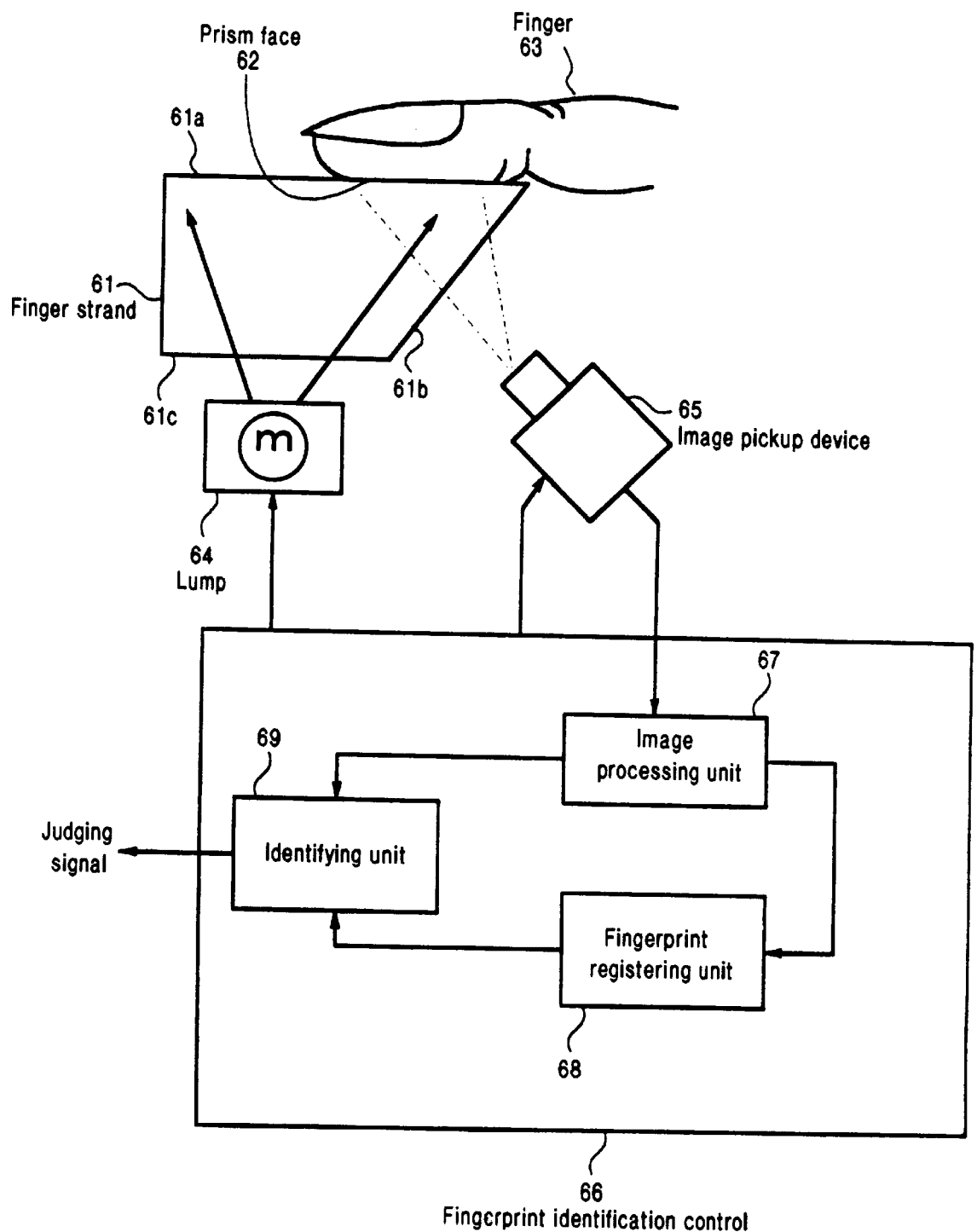
FIG. 18 is a diagram showing the outline of a conventional fingerprint identification device to which the present invention is applied.
Figure 19:
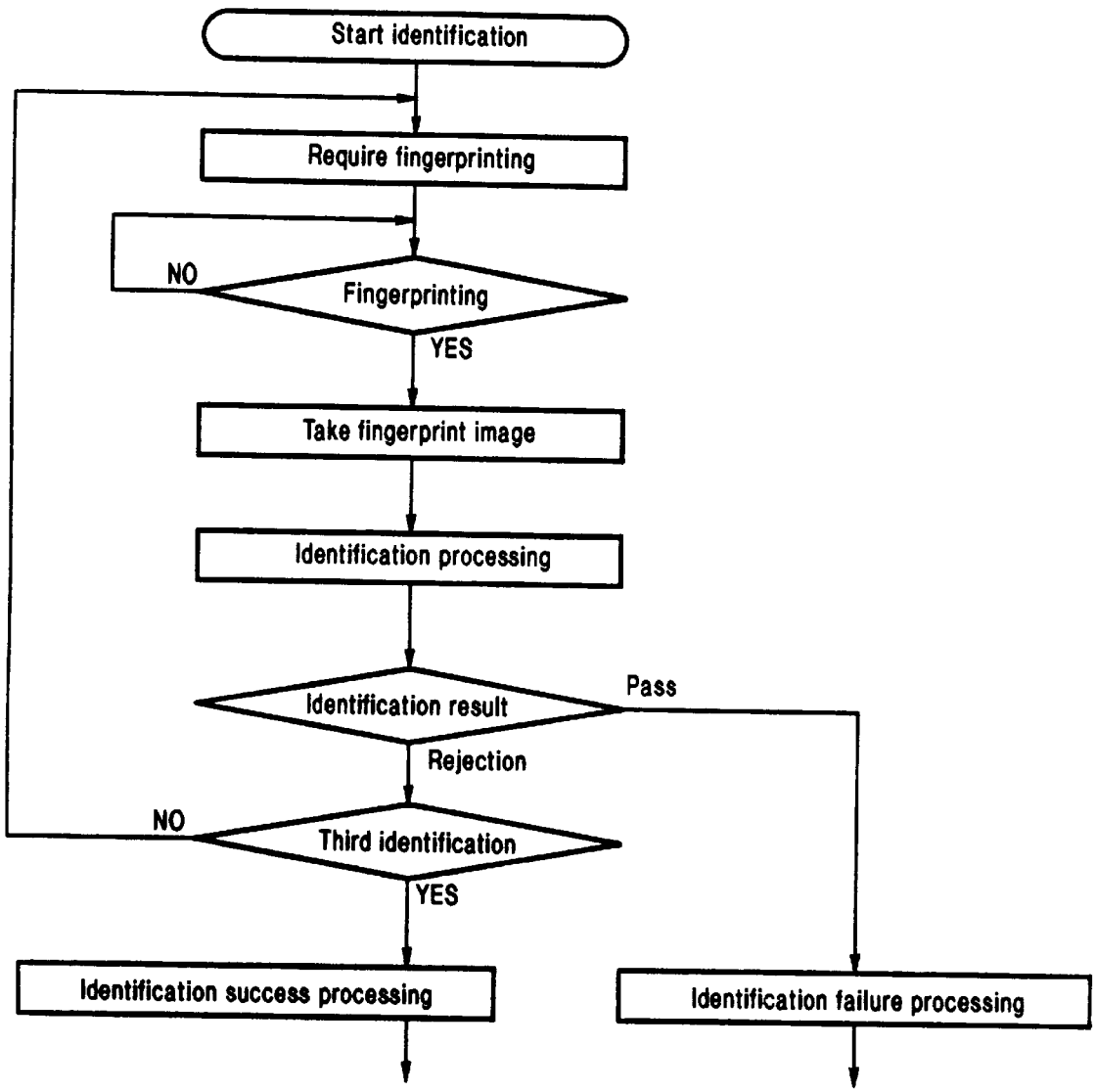
FIG. 19 is a flowchart showing a conventional fingerprinting judgment processing in the fingerprint identification device.

Embodiment 7:

FIG. 9 shows a flowchart of one embodiment of a fingerprinting judging method in the fingerprint identification device according to the invention. The fingerprint identification device used in this embodiment is generally same to the one shown in FIG. 18.

(1) First, the presence of fingerprinting is judged in the first step of the identification processing. The presence of fingerprinting can be judged in view of the fact that when a finger is in a fingerprinting position, the image detected by the image pickup device is bright by the reflection of light on the finger tip face, while the image is dark when the finger is not in the fingerprinting position.

(2) When it is judged in the first step of the identification processing that the fingerprinting has been made, it is required to separate the finger from the fingerprinting surface.

(3) After issuing the instructions for separating the finger as in (2) above, the presence of fingerprinting is judged in succession.

(4) When it is checked in (1) above that the fingerprinting has not been made from the beginning or checked in (3) above that the fingerprinting has not been made after giving the instructions for separating the finger, instructions for fingerprinting are issued again.

(5) After demanding the fingerprinting in (4) above, the presence of fingerprinting is judged again in succession.

(6) When it is confirmed that fingerprinting has been made as a result of judging the fingerprinting again after demanding the fingerprinting in (5) above, the fingerprint image is captured at that point of time.

(7) Using the fingerprint image captured in (6) above, identification with the dictionary images is performed.

(8) When the identification processing in (7) above results in acceptance, the step goes to the identification success processing. When the identification processing results in rejection, the step returns to (1) above, it is checked again that fingerprinting has not been made, and the procedure for identification processing is repeated after fingerprinting. When the third identification processing results in rejection, the step goes to the identification failure processing.

According to this embodiment, when the finger is in position from the beginning to take the fingerprint image to be identified by the fingerprint identification device or it is kept in position continuously from the time it was judged as identification rejection, the fingerprint image of such a finger is not captured as the fingerprint image for identification processing after that.

Therefore, it can be prevented that even when the finger of which the fingerprint has been determined as identification rejection is continuously held for fingerprinting, almost the same fingerprint image as the fingerprint image which has been judged as rejection is taken as the next fingerprint image to be identified, and it is determined as rejection again.

And, regardless of the presence or not of fingerprinting before the identification processing, this embodiment starts to fingerprint from a state that a finger is not touched, and takes a fingerprint image immediately after that, so that the fingerprint image is captured with prescribed timing after fingerprinting and in short time of period. Therefore, it is possible to prevent lowering of an identification rate due to the deformation of the fingerprint image caused by the stretched or shrunk finger skin which is caused when the finger is in position for fingerprinting before the first identification is performed.

Figure 10:
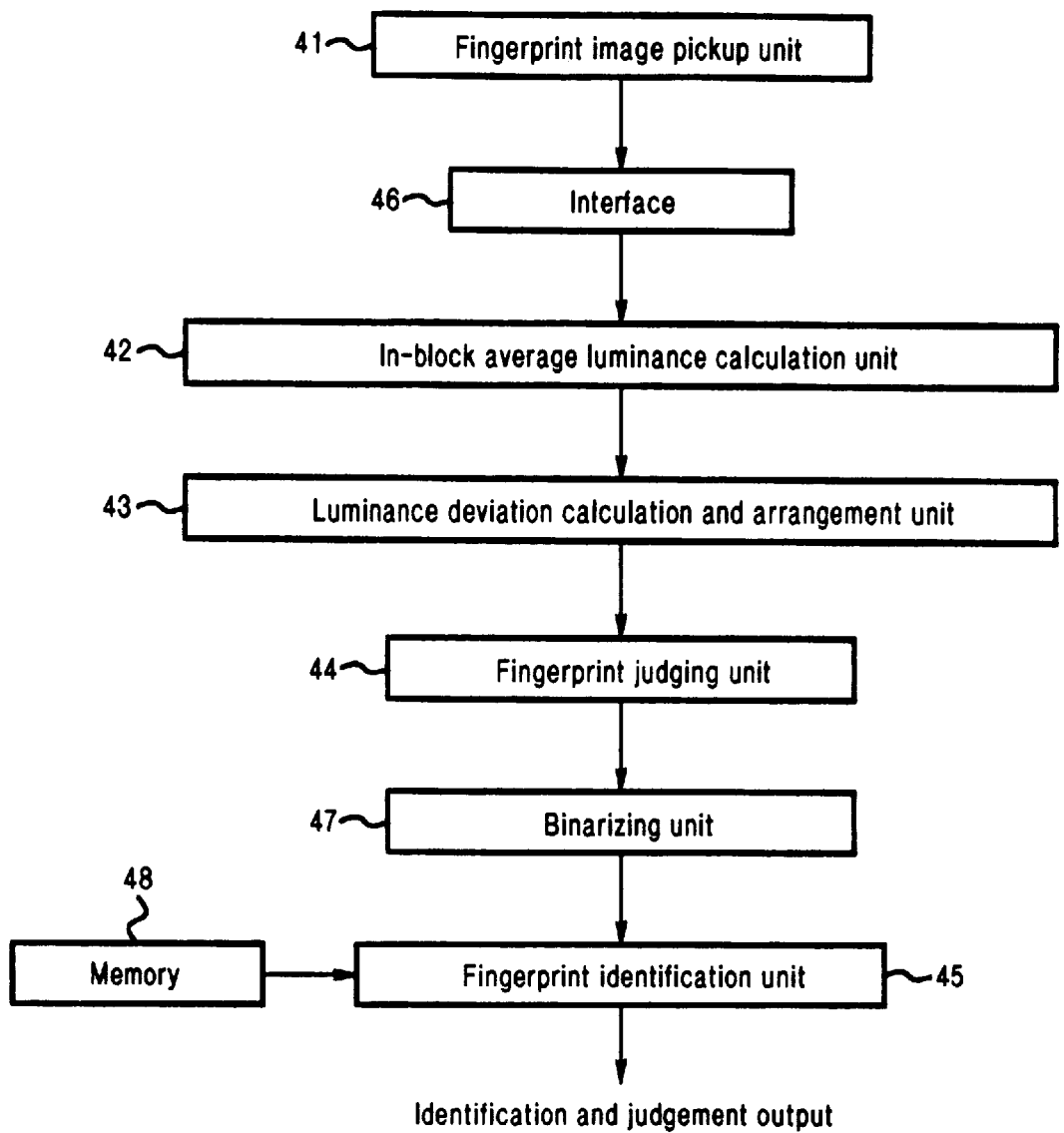
FIG. 10 is an explanatory diagram of the fingerprint identification device in one embodiment of the fingerprint identification device and fingerprinting judging method according to the invention.
Figure 20:
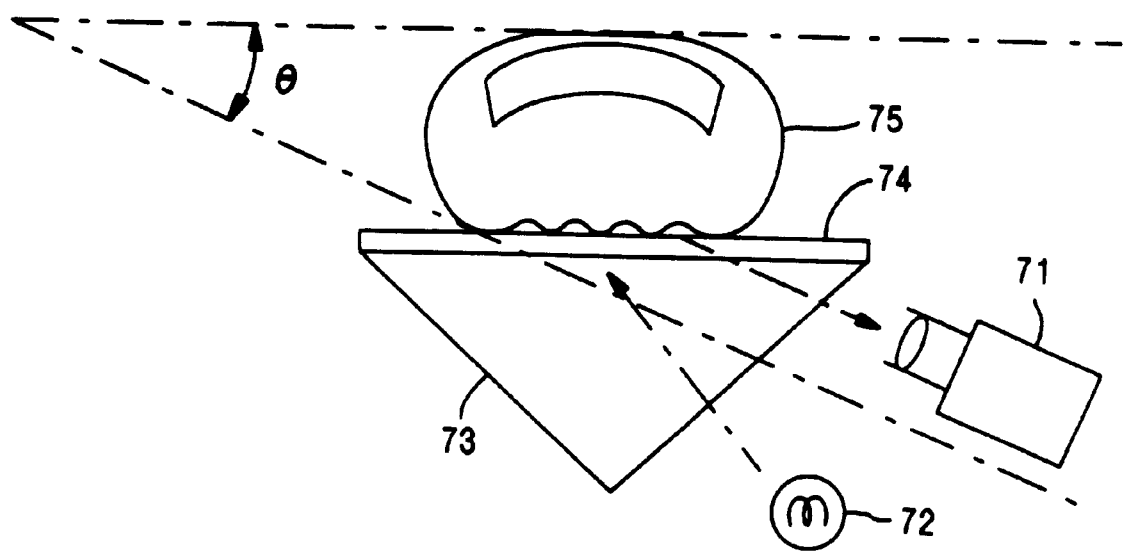
FIG. 20 is an explanatory diagram of a fingerprint picturing unit.

Embodiment 8:

FIG. 10 is an explanatory diagram of one embodiment of the fingerprint identification device according to the invention, in which reference numeral 41 denotes a fingerprint image pickup unit, 42 an in-block average luminance calculation unit, 43 a luminance deviation calculation and arrangement unit, 44 a fingerprinting judging unit, 45 a fingerprint identification unit, 46 an interface, 47 a binarizing unit, and 48 a memory. The fingerprint image pickup unit 41 comprises the camera 71, the light source 72, the prism 73 and the elastic film 74 as shown in FIG. 20.

A multivalued signal from the fingerprint image pickup unit 41 is converted into a digital signal by, for example, the interface 46 and added to the in-block average luminance calculation unit 42. The in-block average luminance calculation unit 42, the luminance deviation calculation and arrangement unit 43, and the fingerprinting judging unit 44 can be a logical circuit having respective functions, but can also be achieved easily by a processor function provided by a microprocessor or the like.

Figure 11:
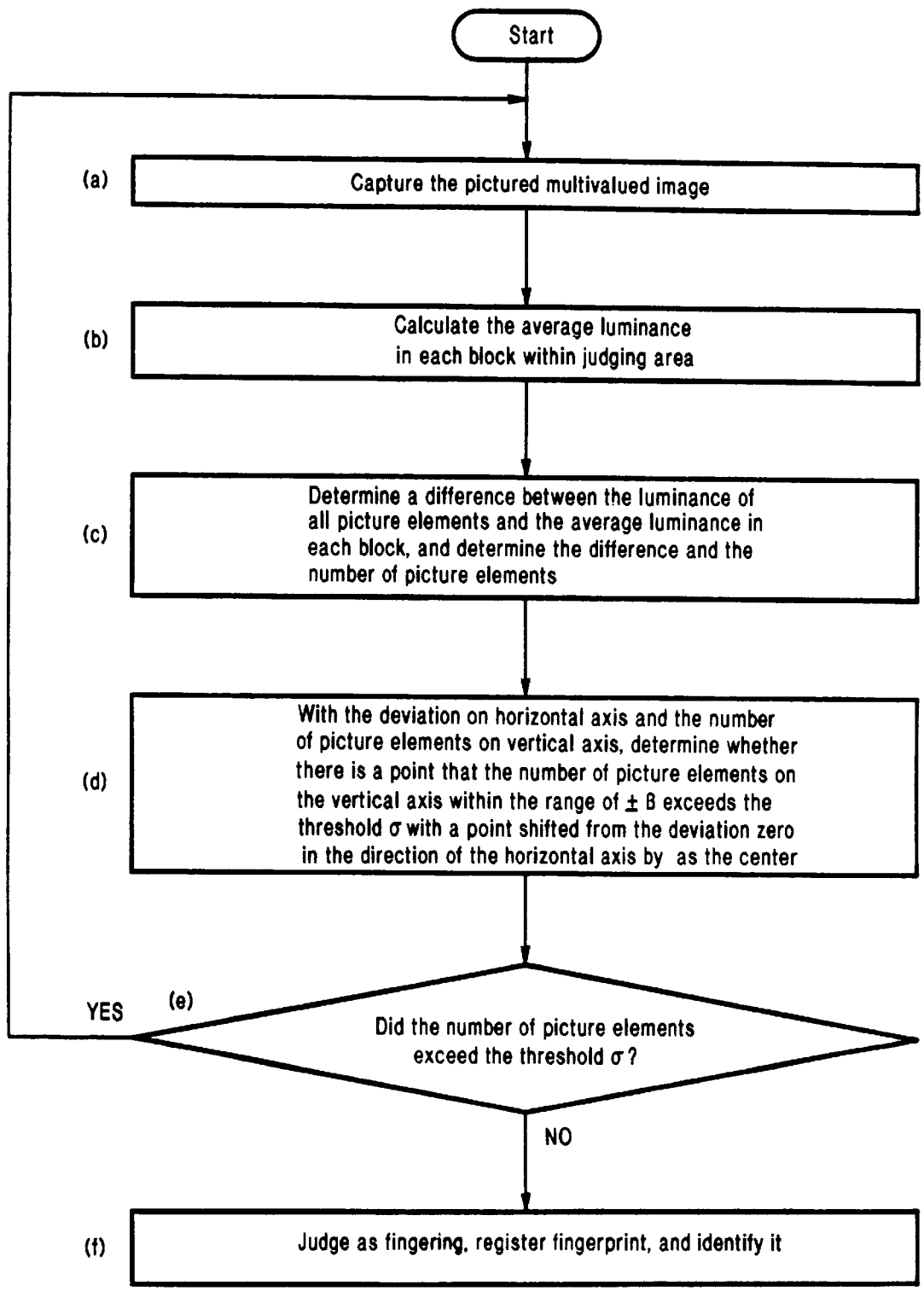
FIG. 11 is a flowchart showing one embodiment of the fingerprinting judging method according to the invention.

FIG. 11 is a flowchart of one embodiment according to the invention, in which steps (a) to (t) show an operation of judging fingerprinting. Description will be made with reference to FIG. 10 in aadition to FIG. 11. A multivalued image taken by the fingerprint image pickup unit 41 is captured through the interface 46 (a), and each in-block average luminance in the judging area is calculated by the in-block average luminance calculation unit (b).

Figure 12:
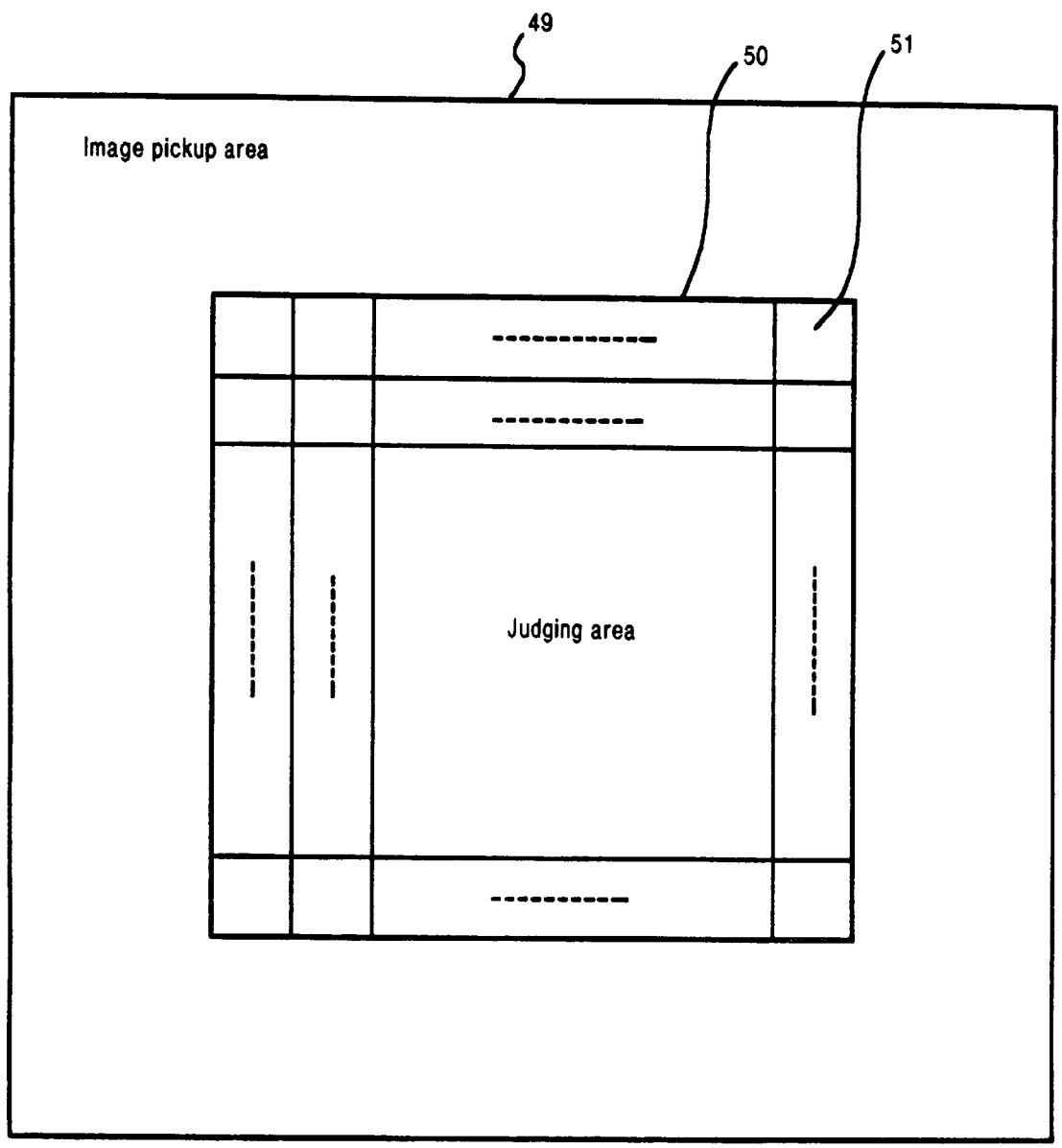
FIG. 12 is an explanatory diagram of a judging area.

For example, when it is assumed that an image pickup area 49 shown in FIG. 12 has 512×512 picture elements, a judging area 50 in the image pickup area 49 can have, for example, 400×320 picture elements, and the judging area 50 is divided into a plurality of blocks 51. Each block 51 can have 16×16 picture elements, for example.

In the same way as described above, when it is assumed that the number of blocks 51 in the judging area 50 is j, the number of picture elements in the block is m, and luminance of the picture elements in the judging area is Pqn, in-block average luminance A q can be determined by the expression (1). As described above, when the number of picture elements in the judging area 50 is 400×320 and the number of picture elements in the block 51 is 16×16, then j=500 and m=256.

After determining the in-block average luminance (b), a difference betw&een the luminance of each picture element and the each in-block average luminance is determined, and the number of picture elements which have the same difference is determined (c). In other words, the deviation between the in-block average luminance A q and the luminance Pqn of each picture element in the block is determined by the luminance deviation calculation and arrangement unit 43 and the deviation of all picture elements in the judging area 50 is determined, thereby determining the number of picture elements having the same deviation.

Figure 13:
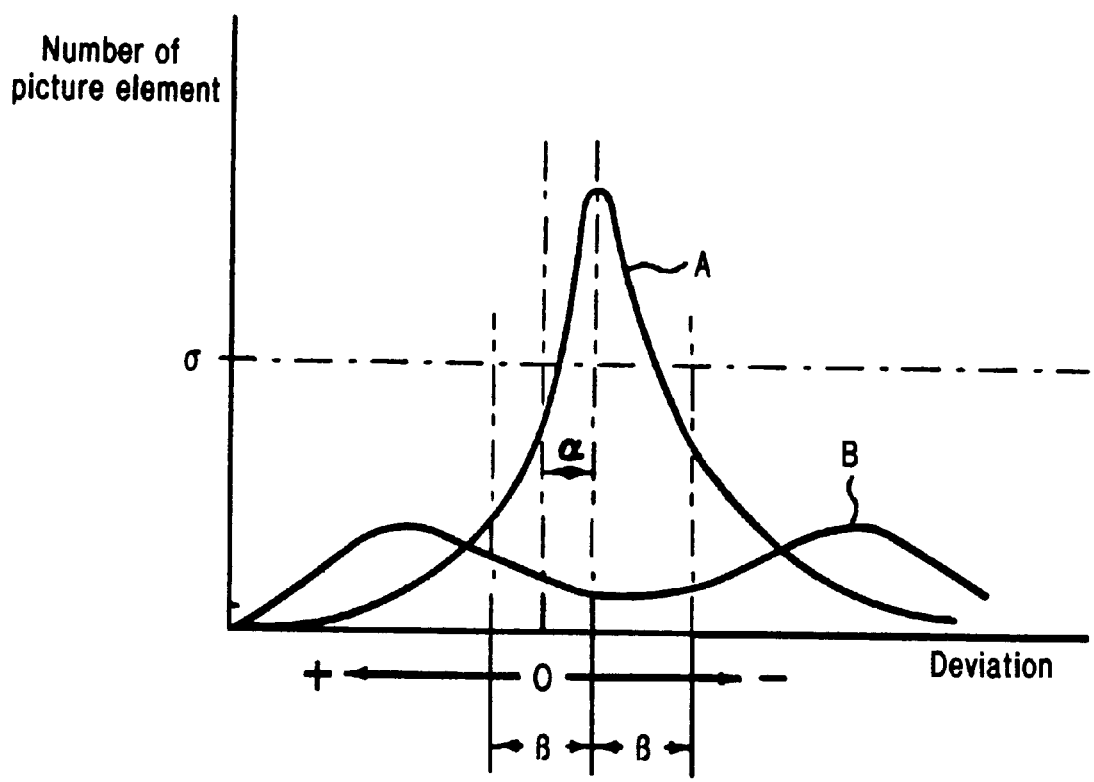
FIG. 13 is an explanatory diagram of fingerprinting judging in an embodiment according to the invention.

And, distribution of picture elements with respect to the deviation is determined with the deviation on the horizontal axis and the number of picture elements on the vertical axis. In other words, the number of picture elements having the same deviation is accumulated by the luminance deviation calculation and arrangement unit 43, and the number of picture elements is arranged with respect to the deviation in a table or the like. FIG. 13 shows one example of the distribution of picture elements with respect to the deviation, in which curve A indicates a state that external light has entered, and curve B indicates a state of fingerprinting. Specifically, when external light enters, the respective blocks 51 in the judging area 50 have almost the same luminance, so that the number of picture elements in the neighborhood of deviation zero increases. Therefore, a unimodal characteristic is indicated. Ideally, when the luminance in the judging area 50 is uniform, the number of picture elements with deviation zero is 128000 in the above-described case, and the number of picture elements with other deviation is zero. Thus, since the state of not fingerprinting shows the unimodal characteristic, when a threshold is determined to be $\sigma$, the number of picture elements exceeds the threshold $\sigma$.

And, when a fingerprint is pictured, the luminance distribution corresponds to very small patterns of ridge and valley lines of the fingerprint, and the number of picture elements in the neighborhood of deviation zero is relatively decreased. Specifically, the picture elements having the luminance same as the in-block average luminance decreases, the picture elements are distributed to correspond to the deviation over a relatively broad area of deviation, and a bimodal characteristic is indicated which shows that the number of picture elements is maximum at a certain value of deviation + or deviation −. In such a case, the maximum number of picture elements does not exceed the threshold $\sigma$.

As to the actual relation between the deviation and the number of picture elements, the maximum value of the curve A or the valley of the curve B does not conform with the position of deviation zero because of the properties of the fingerprint image pickup unit 41, the transfer characteristics in the interface 46 or the like, and the digitizing characteristics of the multivalued image signal. Accordingly, a range of $\pm\beta$ is determined with a point shifted from the point of deviation zero in the direction of the horizontal axis by a prescribed value $\alpha$ as the center, and the number of picture elements within the range is examined to be greater than the threshold $\sigma$ (step (d) in FIG. 11). FIG. 13 shows a sate of shifting in the direction of negative deviation from the deviation zero, but it may shift in the direction of positive deviation depending on the characteristics of each unit. And, the value of $\pm\beta$ is selected in view of the shapes of curves A and B, and determined to include a range where the number of picture elements in the neighborhood of deviation zero of the curve B is small and a range where the number of picture elements in the neighborhood of deviation zero of the curve A is many, so that a judgment error can be decreased.

And, it is judged whether or not the range of $\pm\beta$ includes any number of picture elements exceeding the threshold $\sigma$ (step (e) in FIG. 11), and if any number of picture elements exceeding the threshold $\sigma$ is contained, it means that fingerprinting is not made and external light is entering, the process goes to step (a); and if no number of picture elements exceeding the threshold $\sigma$ is contained, it is judged that fingerprinting is made, and (f) the fingerprint is registered and identified. Specifically, step (e) is performed by the fingerprinting judging unit 44, and when it is judged that fingerprinting is made, binarization is made in the binarizing unit 47, the fingerprint is registered into the memory 48 when registering, and the registered fingerprint is read from the memory 48 when identifying and identified in the fingerprint identification unit 45, and identification judgment output of identifying or not of the person in question can be obtained.

Industrial Applicability

According to the dictionary image renewing method in the fingerprint identification device of the present invention, time of period required for dictionary identification can be shortened, and an identification match rate can be prevented from lowering due to the cancellation of the identification processing because of the continuous occurrence of mismatching with the minutia data.

According to the dictionary image renewing method in the fingerprint identification device of the present invention, the registered dictionary images can be renewed to keep the best dictionary images, so that the fingerprint identification device can keep a high identification rate. Therefore, the present invention performs great services to improve the reliability of the fingerprint identification device.

According to the multiple dictionary registration and registration method in the fingerprint identification device of the present invention, an identification rate can be improved by registering a plurality of dictionaries to identify, and at the time of registering the dictionary image, more stable multiple dictionary images can be obtained readily, and at the time of identifying, the identification processing with the multiple dictionaries can be made readily. Thus, the invention performs great services in improving the performance of the fingerprint identification device.

According to the fingerprinting judging method in the fingerprint identification of the present invention, a continuous state that fingerprints are judged as rejection is prevented, and timing of capturing the fingerprint image after fingerprinting is made constant, and the capturing can be made in a short time after fingerprinting. Thus, the invention performs great services in improving the identification rate of the fingerprint identification device.

The fingerprint identification device and the fingerprinting judging method of the present invention comprises the fingerprint image pickup unit, the in-block average luminance calculation unit, the luminance deviation calculation and arrangement unit, the fingerprinting judging unit and the fingerprint identification unit; deviation between each in-block average luminance and the luminance of each picture element in the judgment area is determined, the number of picture elements having the same deviation is determined, it is judged whether or not the number of such picture elements exceeds the threshold, and if not, it is judged to be a fingerprinting state, and identification of the fingerprint is performed; when it is not a fingerprinting state and intense external light enters or nothing enters, the number of picture elements in the neighborhood of deviation zero increases, so that it is advantageous that the fingerprinting state can be judged with reliability, and in addition to the time of identifying the fingerprint, it can be judged whether the fingerprint has been read accurately at the time of fingerprint registration.

And, in the fingerprint identification device comprising the fingerprint image pickup unit, the in-block average luminance calculation unit, the luminance deviation calculation and arrangement unit and the fingerprinting judging unit, when deviation between the average luminance of every multiple blocks in the judging area and the luminance of the picture elements in the block is determined and the deviation is indicated on the horizontal axis and the number of picture elements having the same deviation on the vertical axis, it is judged as a fingerprinting state when the number of picture elements within the range of $\pm\beta$ does not exceed the threshold $\sigma$ with the point shifted from the point of deviation zero in the direction of the horizontal axis by a prescribed value $\alpha$ as the center, and the number of picture elements within the range is examined to be greater than the threshold $\sigma$, so that it is advantageous that the fingerprinting state can be judged accurately by selecting the shift value $\alpha$ and the judging area $\beta$ according to the characteristics of each unit.

What is claimed is:

1. A fingerprint identification device comprising:
    a fingerprint image pickup unit which receives reflected light from a light source to take a picture,
    an in-block average luminance calculation unit which divides a fingerprint judging area into a plurality of blocks and calculates average luminance within said blocks according to a multivalued image signal from said fingerprint image pickup unit,
    a luminance deviation calculation and arrangement unit which determines deviation between the in-block average luminance from said in-block average luminance calculation unit and the luminance of each picture element in said judging area to determine the number of picture elements corresponding to said deviation,
    a fingerprinting judging unit which judges that fingerprinting has been made for said fingerprint image pickup unit when the number of picture elements within a prescribed range with the deviation near zero does not exceed a threshold for the number of picture elements corresponding to the deviation from said luminance deviation calculation and arrangement unit, and
    a fingerprint identification unit which identifies the fingerprint based on said multivalued image signal from said fingerprint image pickup unit when said fingerprinting judging unit has judged the fingerprinting state.

2. A fingerprinting judging method in a fingerprint identification device comprising determining average luminance for every plurality of blocks in a fingerprint judging area based on a multivalued image signal pictured by a fingerprint image pickup unit, determining deviation between the average luminance of said every block and the luminance of picture elements in said blocks, determining the number of picture elements corresponding to said deviation in said judging area as the whole, judging whether said number of picture elements in a prescribed range exceeds a threshold with a point shifted from the point of deviation zero in the direction of the horizontal axis by a prescribed value when said deviation is on the horizontal axis and said number of picture elements on the vertical axis, and when it does not exceed, judging that fingerprinting has been made.

* * * * *